(12) United States Patent
Bricaud et al.

(10) Patent No.: US 7,326,913 B2
(45) Date of Patent: Feb. 5, 2008

(54) BALL-BASED DEVICE FOR CONTROLLING THE MOVEMENT OF A CURSOR, AND OPTICAL UNIT FOR SUCH A DEVICE

(75) Inventors: Herve' Guy Bricaud, Dole (FR); Yves Pizard, Dole (FR); Julien Gavignet, Chemaudin (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/454,548

(22) Filed: Jun. 16, 2006

(65) Prior Publication Data

US 2006/0289727 A1 Dec. 28, 2006

(30) Foreign Application Priority Data

Jun. 27, 2005 (FR) .................................. 05 51776

(51) Int. Cl.
*G06F 3/033* (2006.01)
(52) U.S. Cl. ..................... 250/221; 345/166; 345/167; 250/227.11
(58) Field of Classification Search ................ 250/221, 250/222.1, 231.13–231.14; 345/163–167
See application file for complete search history.

(56) References Cited

U.S. PATENT DOCUMENTS

| 6,084,574 | A | * | 7/2000 | Bidiville | ...................... 345/166 |
| 2002/0190954 | A1 | * | 12/2002 | Chen | ........................... 345/167 |
| 2004/0036677 | A1 | | 2/2004 | Ono et al. | |
| 2005/0141224 | A1 | * | 6/2005 | Hama | ......................... 362/363 |
| 2005/0231482 | A1 | * | 10/2005 | Theytaz et al. | ............. 345/166 |
| 2005/0248535 | A1 | * | 11/2005 | Sawyer | ....................... 345/167 |

FOREIGN PATENT DOCUMENTS

| WO | WO 02/075641 A1 | 9/2002 |
| WO | WO 2004059613 A1 | 7/2004 |

* cited by examiner

*Primary Examiner*—Thanh X. Luu
*Assistant Examiner*—Seung C. Sohn
(74) *Attorney, Agent, or Firm*—Peter Van Winkle

(57) ABSTRACT

The invention proposes a device (20) comprising an actuation ball (30, FIG. 13), a casing (22) that surrounds the ball, elements (56) for guiding the ball in rotation, a first detection light source (LS1) for emitting at least one detection beam (EL1), and a detection sensor (126) to capture at least the light (RL1) originating from the lit zone of the ball (30), characterized in that the first light source (LS1) emits an invisible light (EL1), and in that the device comprises a second light source (LS2), distinct from the first light source (LS1) for illuminating the ball (30) that emits a visible illumination light (EL2) towards the ball (30).

20 Claims, 18 Drawing Sheets

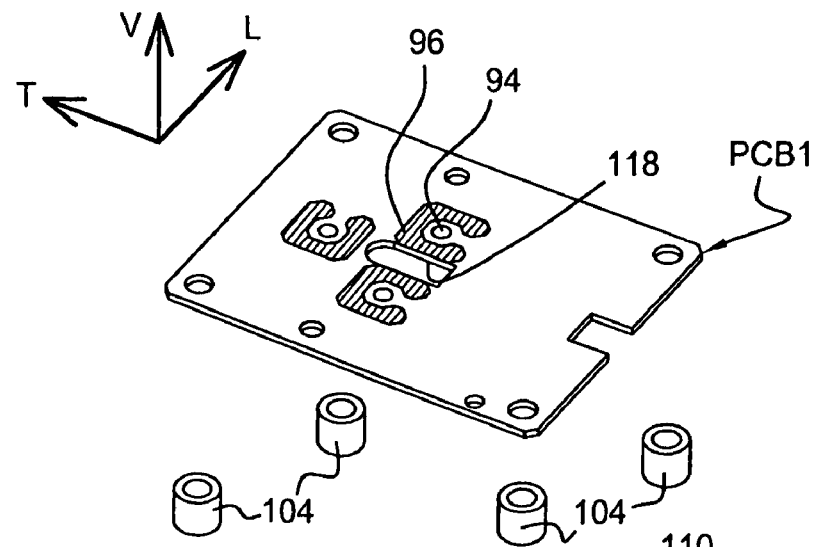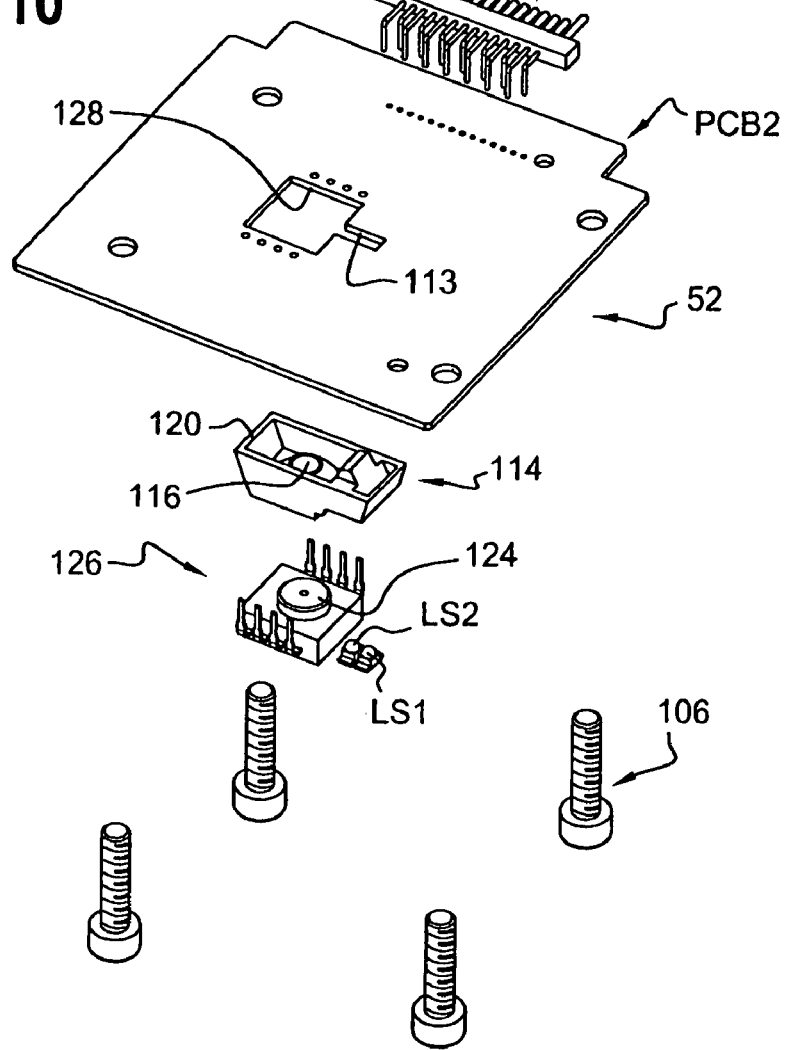
Fig. 10

BALL-BASED DEVICE FOR CONTROLLING THE MOVEMENT OF A CURSOR, AND OPTICAL UNIT FOR SUCH A DEVICE

CROSS-REFERENCE TO RELATED APPLICATION

Applicant claims priority from French patent application S.N. 0551776 filed Jun. 27, 2005.

BACKGROUND OF THE INVENTION

The present invention relates to a ball-type control device, for controlling the movements of a cursor on a screen of an electronic apparatus. The control device includes an actuation member in the form of a spherical ball that has a convex spherical surface, called the detection surface, that is capable of being manipulated by a user. The control device is commonly called a "trackball" in which the surface of the ball is manipulated directly by the fingers or the hand of the user.

The invention relates to a control device of the "optical" or optoelectronic type comprising a ball casing that has a concave face that surrounds at least a portion of the ball. The control device has a casing with at least one window for light beams to pass through for detecting the rotation of the ball, and has elements for rotational guidance of the ball, such as rolling spheroids that protrude through the concave face of the casing and on which the ball, when it is manipulated, rolls in order to rotate about its center. The control device also has a light source to emit at least one incident detection light beam towards the ball, and finally means, comprising particularly a lens and means forming image sensors that receive light originating from the zone of the ball lit by the incident detection light beam.

Such a general design is known from document DE-A-3.407.131 published in 1985 that describes a mouse whose ball is mounted so as to rotate in a ball casing, or shell, in which it is guided in rotation by spheroids each of which is itself received in a matching cavity on the concave surface of the shell that houses the ball. Such device comprises two sets of light-emitting diodes and optical sensors that form the optical means for detecting any rotary movement of the ball about its centre in order to convert these rotary movements into electronic signals.

Accordingly, the convex spherical surface of the ball comprises an even and evenly distributed pattern over the whole surface of the ball that is lit and whose image is captured, through a lens, by the sensors then analysed by known image processing means.

Such a design is particularly advantageous because, with a particularly small number of components, it makes it possible to detect and analyse the rotary movements of the ball without elements in contact with the ball, the only moving mechanical component consisting of the ball itself.

The casing of the device, in this instance of the mouse, also comprises, on the outside, keys for actuating various switches that can be actuated by the fingers of the user who is manipulating the mouse, for example for transmitting signals, for example for validating a position of a cursor on a computer screen.

Many examples are known of transposing the teachings of this document for the design of a trackball in which a top portion of the ball protrudes from the casing to allow it to be manipulated directly by the user's hand.

Such a control device or trackball may be used in many applications, particularly when it has very small dimensions in a portable electronic apparatus such as a telephone called a portable or GSM telephone, or else in a personal digital assistant (PDA).

When it has larger dimensions, a trackball may also be used, for example, on board a motor vehicle, in the passenger compartment of the vehicle, to control various functions via a display screen on which a cursor moves.

The invention aims to propose an enhancement of such a ball-based control device.

SUMMARY OF THE INVENTION

The invention proposes a control device of the type previously mentioned comprising at least a first detection light source to emit at least one incident detection light beam towards the ball, characterized in that:
- the first light source emits an invisible light;
- the device comprises at least a second light source, distinct from the first light source, for illuminating the ball that emits a visible illumination light towards the ball.

Thus, the user has a control device making it possible to perform independently functions of detecting the rotation of the ball and of illuminating the ball, which provides a very great flexibility of use.

For example, the light source—consisting in the prior art of the detection light source that constantly emits in the visible domain and that is reflected or diffused on the surface of the ball—which can be perceived as a spurious light in a passenger compartment or a cockpit in the case of an application for which discretion is indispensable, can be eliminated.

It is also possible to illuminate the ball in the colour desired by the user independently of the wavelength of the light source used for detection. It is therefore, for example, possible to provide a harmony of the wavelengths, and hence of the visible colours, emitted by multiple light sources such as light-emitting diodes LED present in the passenger compartment of a vehicle whose manufacturer also usually fixes the common wavelength characteristic of that manufacturer.

Such a possibility is offered by the design according to the invention, without having to adapt or where necessary to create an image acquisition system corresponding to the wavelength of the light source necessary to detect rotation.

The invention also makes it possible to offer the possibility of adjusting the intensity of illumination of the ball (where necessary providing plays of light, twinkling, blinking, etc) without being concerned with the impact on the quality of the optoelectronic detection of the rotation of the ball by the sensor which is, for example, an image acquisition system.

The invention also makes it possible, with respect to the illumination, to eliminate the visible variations of light intensity between the "standby" state and the "movement detection" state which exist in the conventional optical systems for detecting movements with detection light sources emitting in the visible domain.

According to other features of the invention:
- the first light source emits a detection light in the infrared domain;
- the wavelength of the infrared detection light emitted by the first detection light source is equal to approximately 880 nm;
- the wavelength of the visible illumination light emitted by the second illumination light source lies between approximately 470 nm and approximately 630 nm;
- the light source is a light-emitting diode;

the first and second light sources belong to an optoelectronic module fitted to the casing;
the module comprises an optical light guidance unit comprising:
a first light entry surface for the invisible light that is emitted by the first light source;
a second light entry surface for the visible light that is emitted by the second light source;
a third light entry surface for the light originating from the zone of the ball lit by the incident detection beam;
a first exit surface for the invisible light that is emitted by the first light source and that entered the optical unit via the first entry surface;
a second exit surface for the invisible light that is emitted by the second light source and that entered the optical unit via the second entry surface;
a third exit surface for the light originating from the zone of the ball lit by the incident detection beam and that entered the optical unit via the third entry surface;
the said third entry surface, belongs to a portion of the unit that is shaped like an objective lens;
the first and second light entry surfaces and the third light exit surface are oriented generally downwards and are arranged in a bottom face of the optical unit;
the first and second light exit surfaces and the third light entry surface are oriented generally upwards and are arranged in a top face of the optical unit;
the light entry and exit surfaces are generally aligned in a vertical and transverse plane of the optical unit;
the third light exit surface is aligned substantially vertically with the third light entry surface;
the second light entry surface is situated transversely between the first light entry surface and the third light exit surface; and the first light exit surface is situated transversely between the second light exit surface and the third light entry surface;
the first light entry surface is situated transversely between the second light entry surface and the third light exit surface;
the third light entry surface is situated transversely between the second light exit surface and the first light exit surface;
the first light exit surface is situated transversely between the second light exit surface and the third light entry surface;
the optical unit comprises a housing capable of receiving the sensor of the detection light beam reflected by the ball;
the said housing is a blind housing open in the bottom face of the optical unit;
the casing comprises a window for the emitted lights and the light originating from the zone of the ball lit by the incident detection beam to pass through.

The invention also relates to an optical unit for a device according to the invention, characterized in that it is made in a single piece by moulding and/or machining of a block of material transparent to the said lights.

BRIEF DESCRIPTION OF THE DRAWINGS

Other features and advantages of the invention will appear on reading the following detailed description for the comprehension of which reference should be made to the appended drawings in which:

FIG. 10 is an exploded isometric view of the various components forming the bottom optoelectronic module of the device;

DESCRIPTION OF THE INVENTION

For the description of the invention, the vertical, longitudinal and transverse orientations will be adopted in a nonlimiting manner according to the V, L, T indication in the figures.

Figure 1:
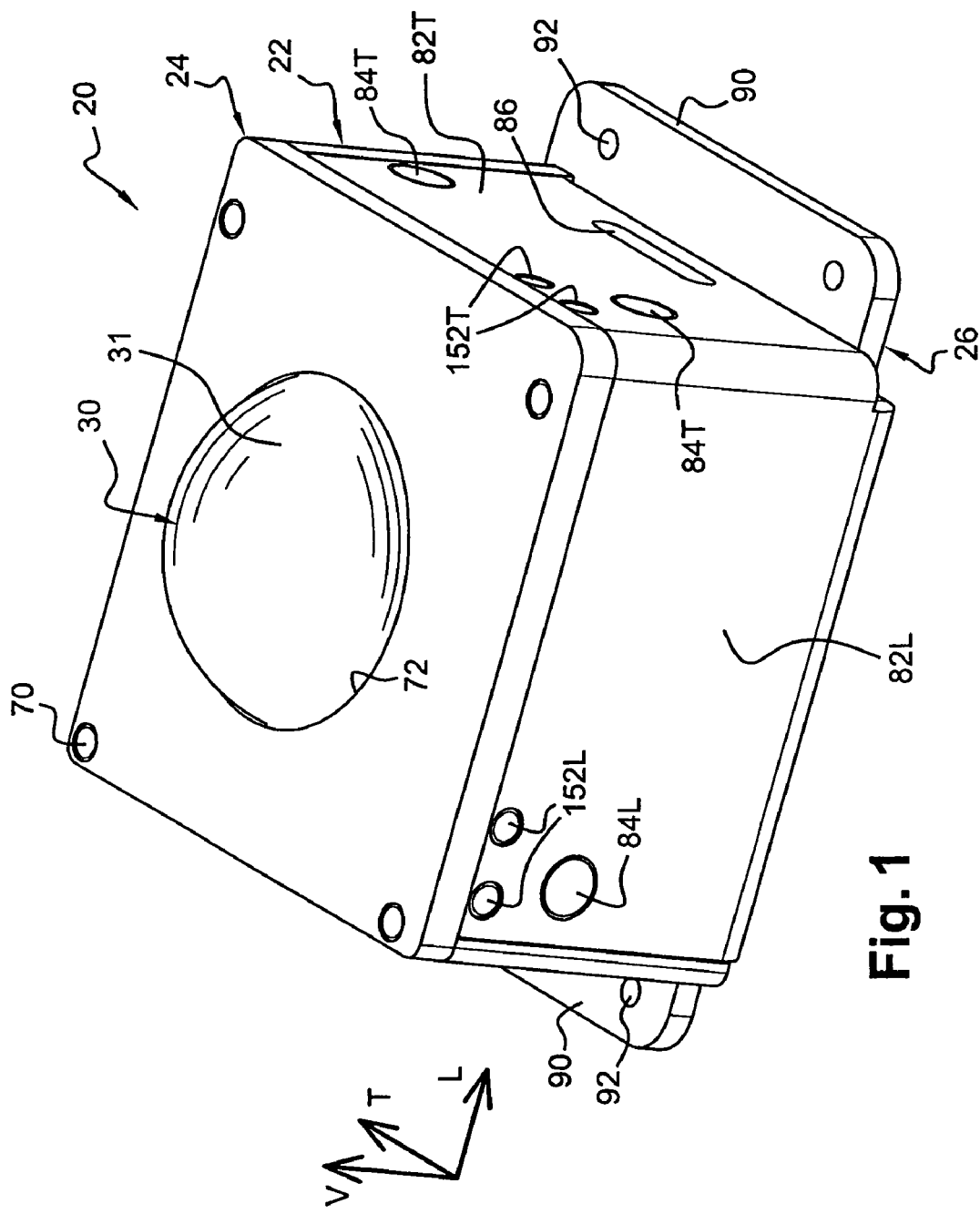
FIG. 1 is an isometric external view, from above and from three-quarters front right, that represents a control device, particularly for controlling the movements of a cursor on a screen of an electronic apparatus, comprising an actuation member in the form of a spherical ball according to the teachings of the invention.

By convention, the terms bottom, top, front, rear, and left, right will also be adopted with reference to FIG. 1.

In the following description, identical, similar or analogous elements will be indicated by the same numeric or alphanumeric references.

In the embodiment illustrated in the figures, the control device is a ball device, also called a "trackball".

The device 20 essentially comprises a central control or actuation ball or sphere that is housed in a casing 22 of a general shape that is substantially a rectangular parallelepiped that is closed by a top cover 24 and by a bottom cap 26.

Figure 2:
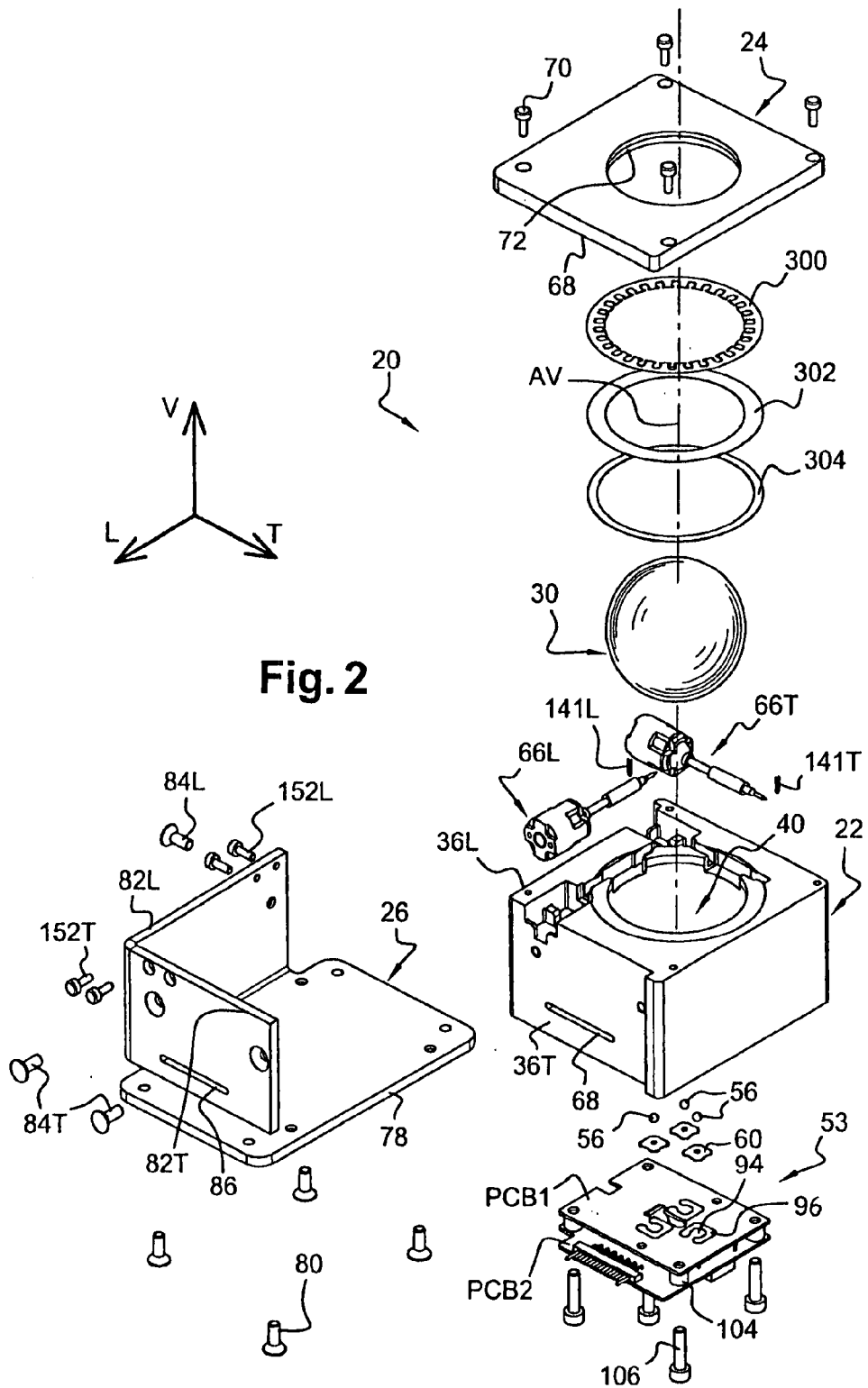
FIG. 2 is an exploded isometric view of the various components of the device of FIG. 1.
Figure 3:
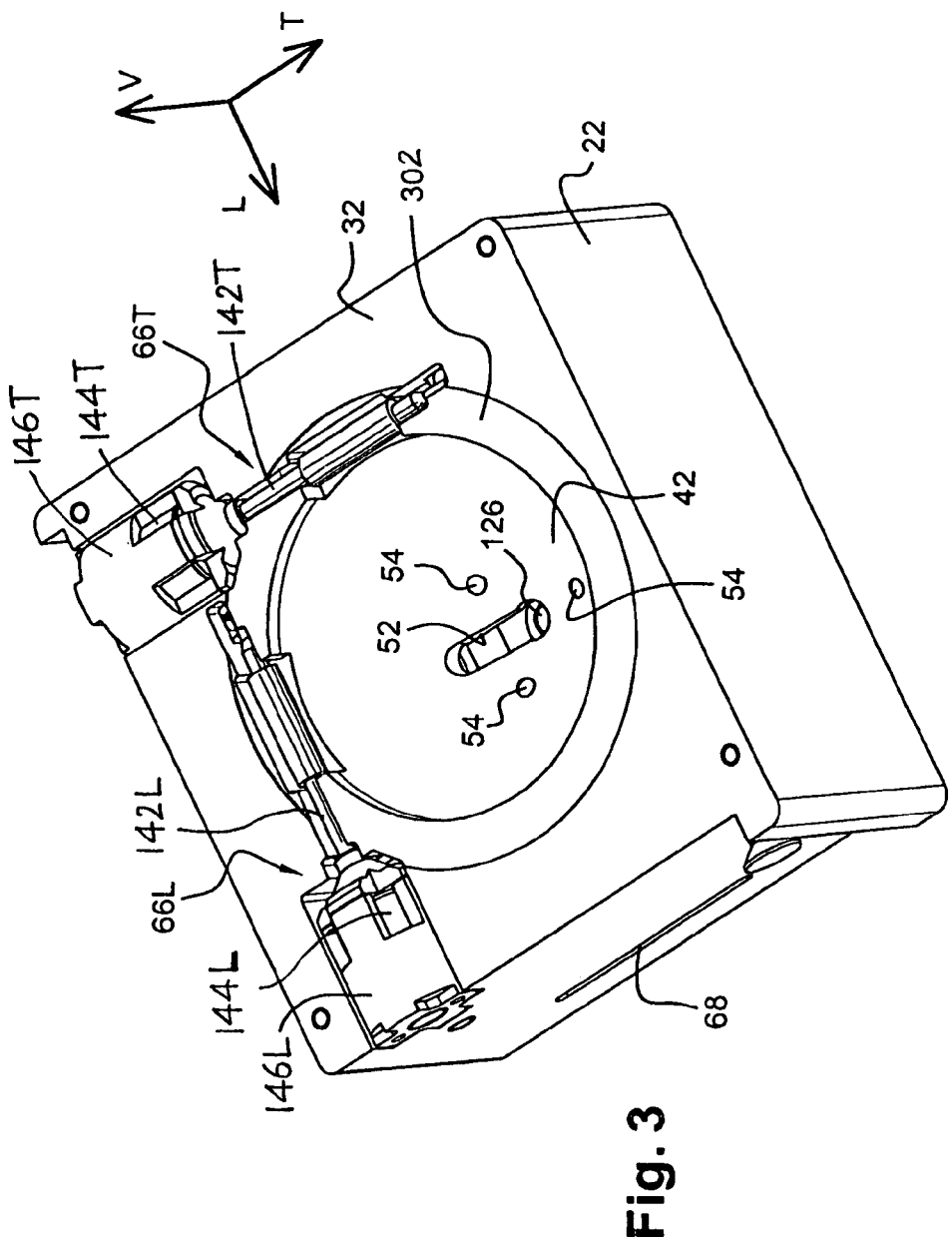
FIG. 3 is a view similar to that of FIG. 1 in which the device is represented without its top cover, without the actuation ball, without the sealing means, and without its bottom cap.
Figure 4:
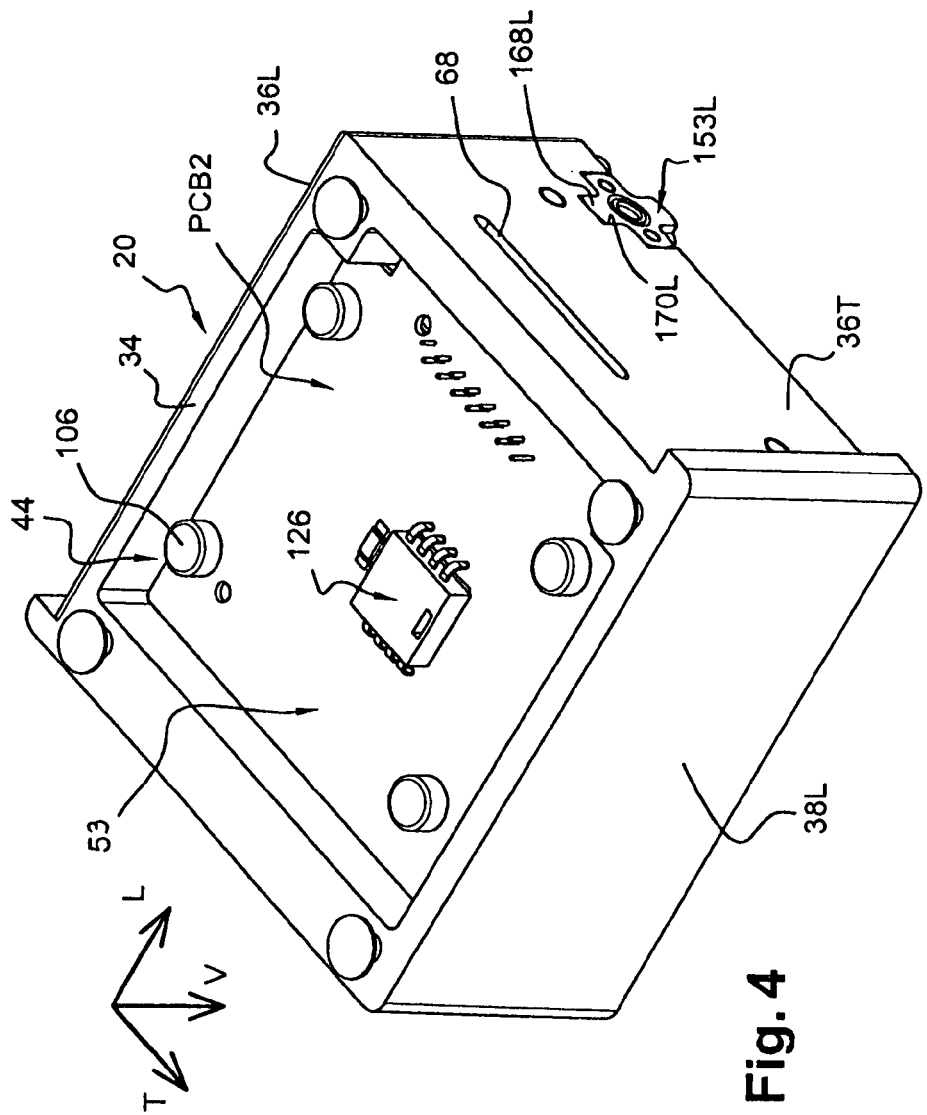
FIG. 4 is a bottom isometric view of the device illustrated in FIG. 3.

All the components of the device 20 are, as can be seen in particular in FIG. 2, stacked axially along the main vertical axis AV that passes through the centre C of the ball 30 and that also forms the axis of depression of the ball.

Figure 9:
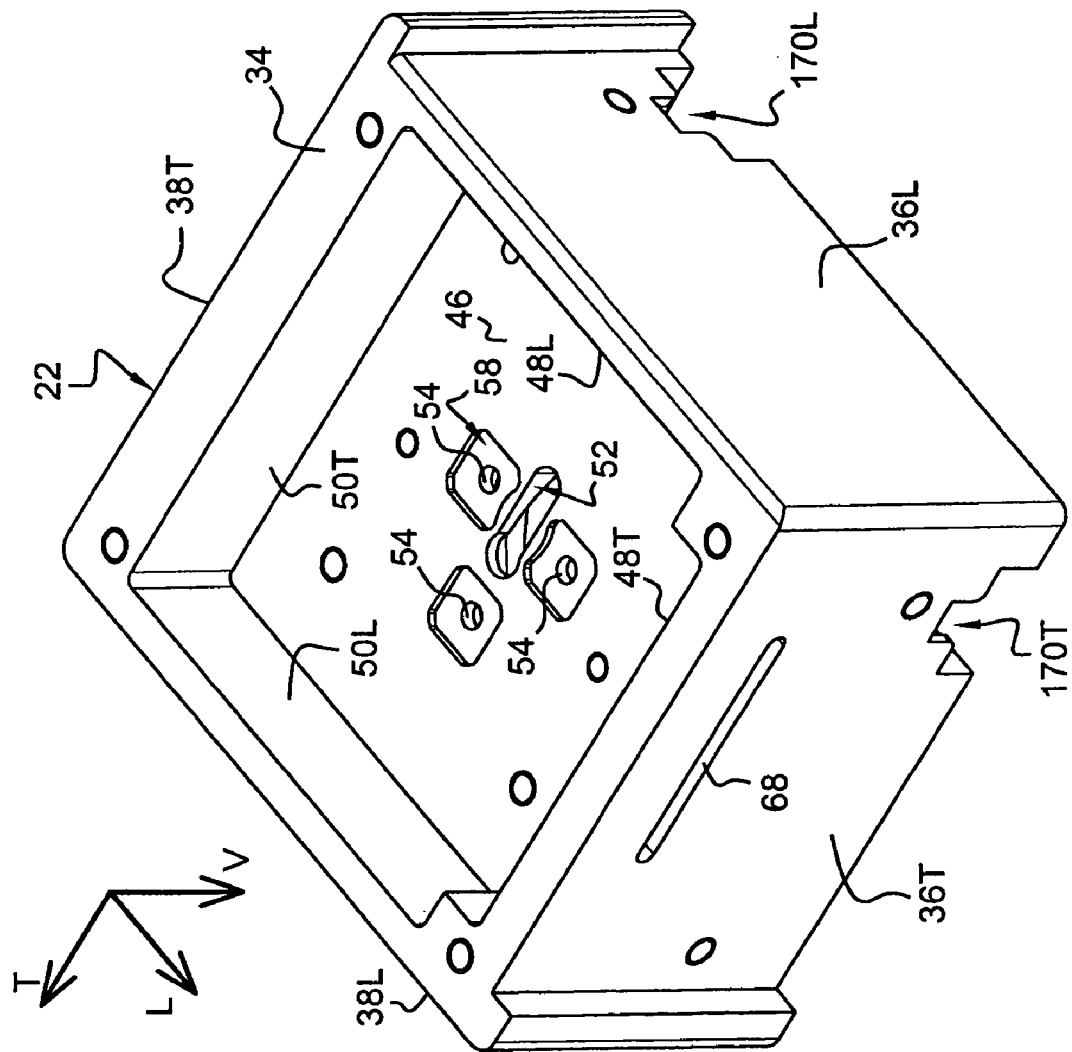
FIG. 9 is a bottom view of the plastic insulating casing of the device.
Figure 12:
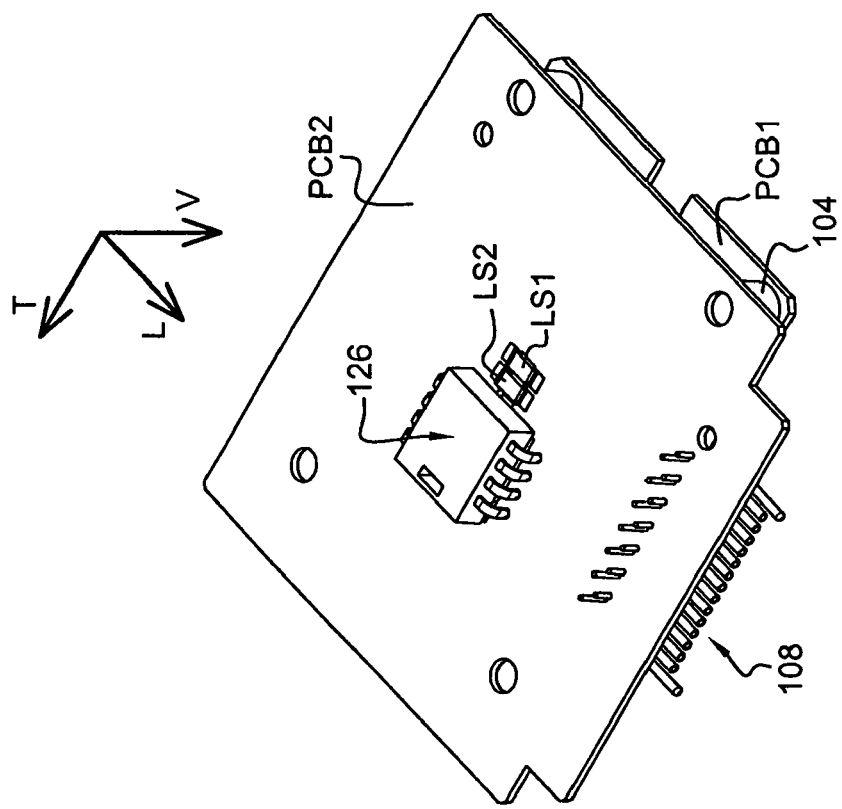
FIG. 12 is a bottom isometric view of the bottom module of FIG. 11.

As can be seen in particular in greater detail in FIG. 9, the casing 22 is a moulded piece, for example made of electrically insulating plastic, that has, or is delimited by a horizontal top face 32 and a horizontal bottom face 34.

The device 20 is fitted, on the top portion, with two tactile sensation generators 66L, 66T that are of identical design and that are arranged along two horizontal axes, longitudinal AL and transverse AT.

Thus, the elements and components that are identical, similar or analogous of the tactile sensation generators and that are associated therewith will be indicated by the same reference numbers indexed "L" and "T" respectively.

The casing 22 is also has, or is delimited by its longitudinal vertical side faces 36L and 38L and by its transverse vertical side faces 36T and 38T.

In its top face 32, the casing 22 delimits a cavity 40 of a generally hemispherical shape that is delimited by a concave hemispherical face 42.

The cavity 40 houses a little more than the bottom half of the ball 30 that it thus surrounds partially and, in the normal position of use of the ball, there is a radial clearance between the outer convex spherical peripheral surface 31 of the ball 30 and the concave face 42 of the cavity 40.

In its bottom face 34, the casing 22 delimits a bottom housing 44, vertically open downwards, that is of generally rectangular parallelepipedic shape and that is delimited by a top horizontal wall 46 and by vertical side faces 48L, 48T, 50L and 50T.

The bottom housing 44 receives all the components of a bottom optoelectronic module 53 for detecting the rotary movements of the ball 30, for illuminating the ball, for processing the signals and for controlling the tactile sensation generators, that is particularly illustrated in FIGS. 10 to 16.

The casing 22 is traversed vertically in its thickness by an oblong central slot 53 of transverse orientation and by three vertical tubular ducts 54.

Figure 5:
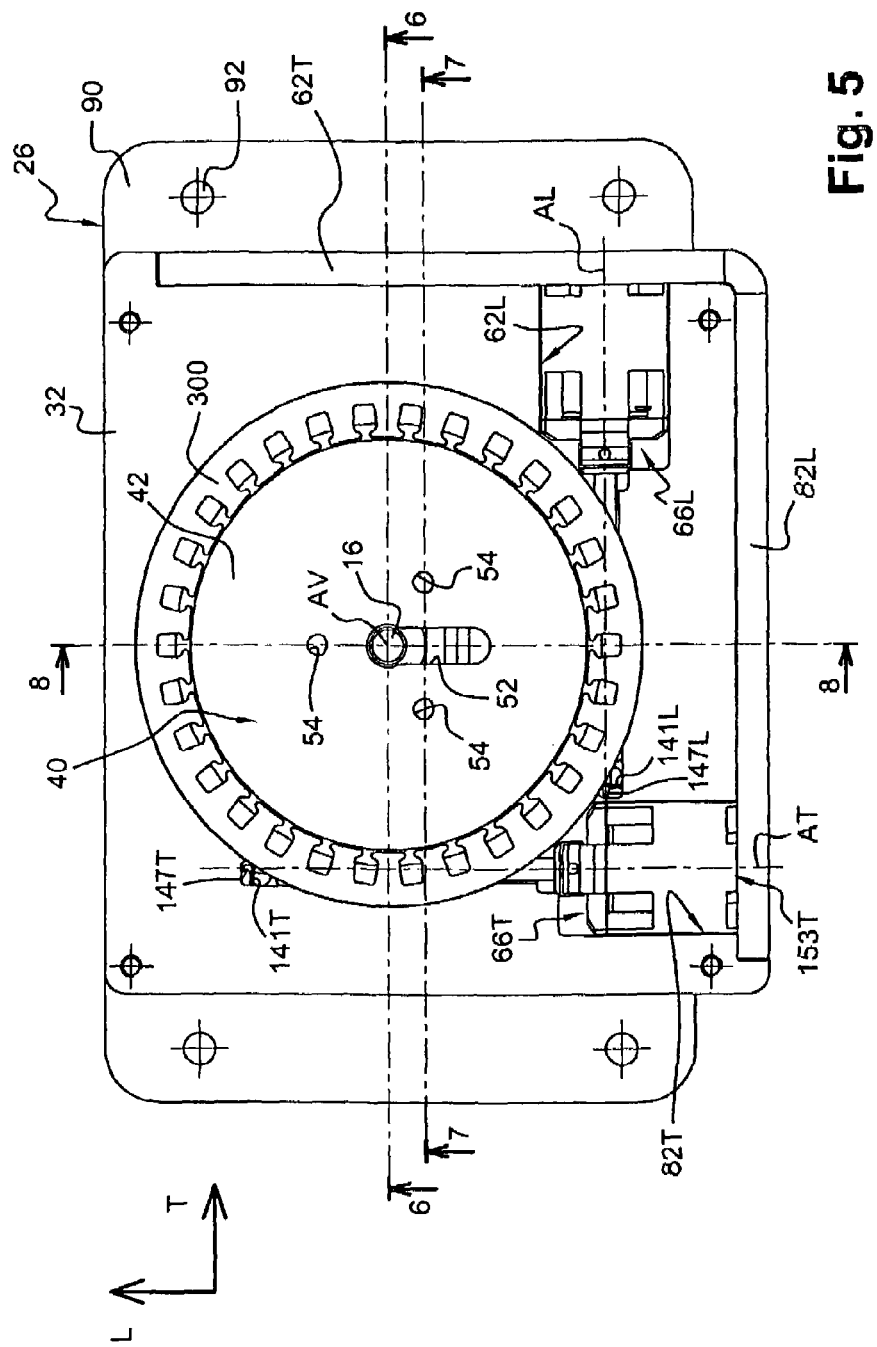
FIG. 5 is a top view of the device illustrated in FIG. 3 with the actuation ball, the sealing means and its bottom cap.
Figure 6:
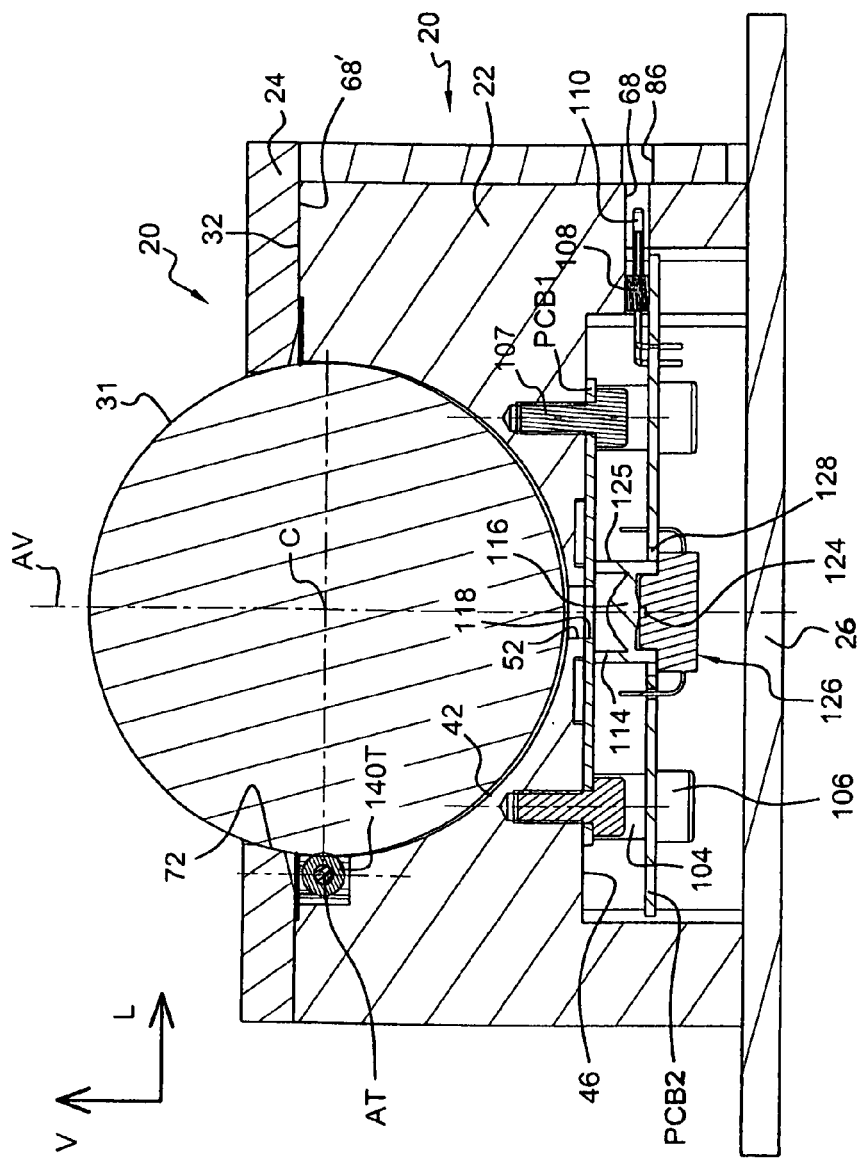
FIGS. 6 to 8 are views, on a larger scale, in section along the lines 6-6 to 8-8 of FIG. 5.
Figure 7:
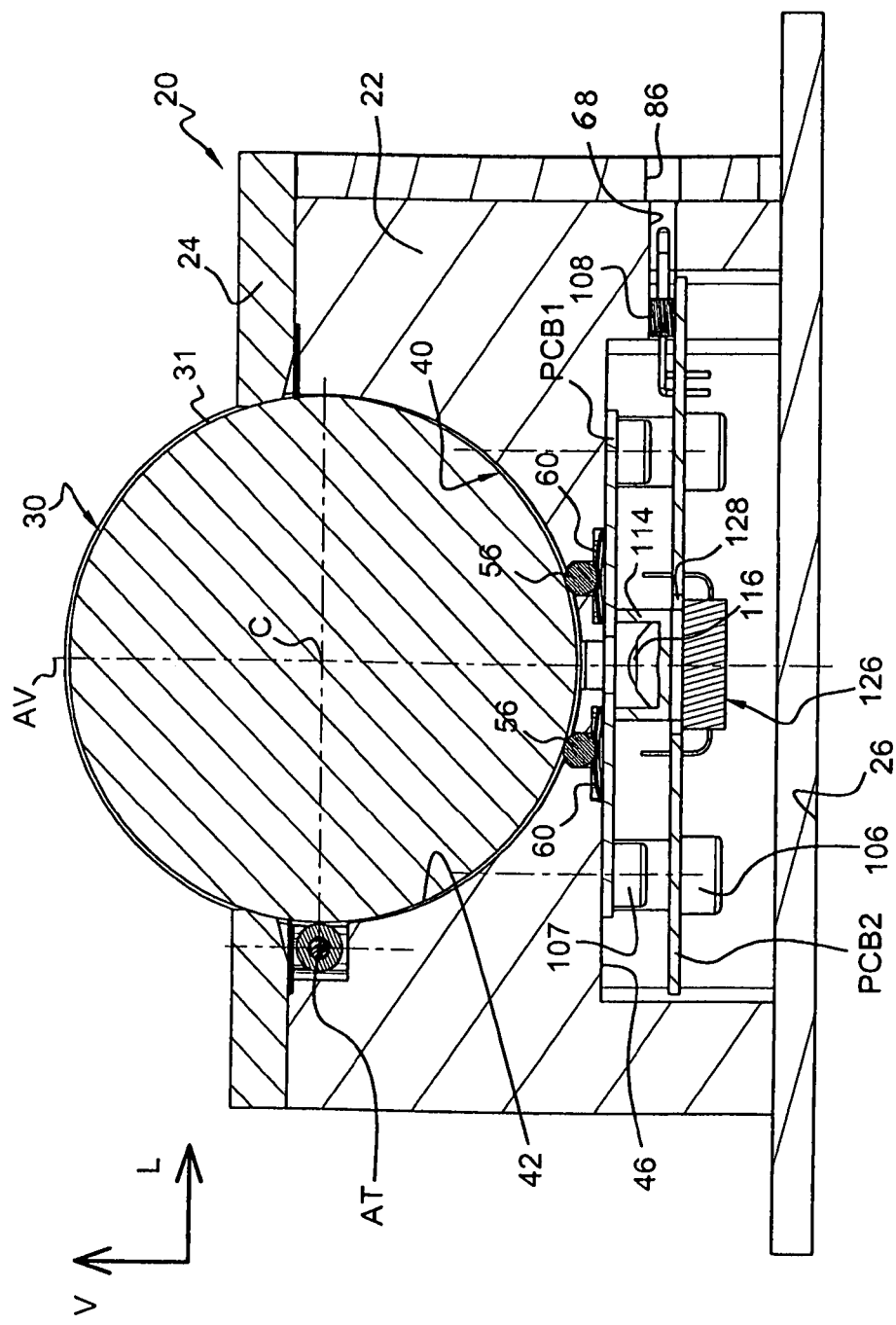
Figure 8:
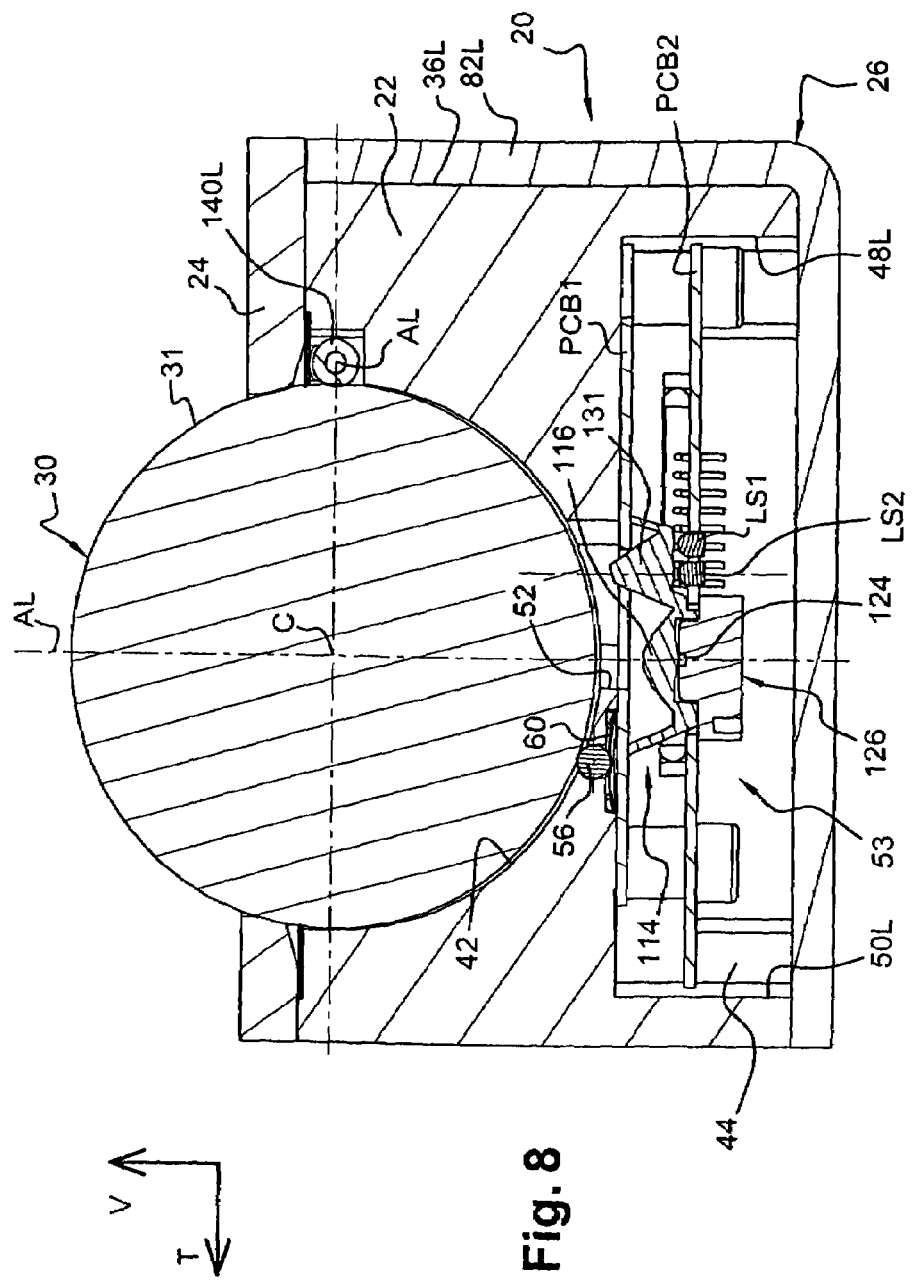

As can be seen in particular in FIG. 5, the three ducts 54 are distributed symmetrically and angularly in an even manner at 120° about the central axis AV, their axes forming an equilateral triangle.

Like the slot 52, each tubular duct 54 is open vertically at its two opposite ends and receives, slidingly in the vertical direction under the action of the ball 30, a rolling and/or sliding spheroid 56.

The three spheroids 56 guide the ball 30 in rotation and accordingly they normally protrude vertically through the concave face 42 of the cavity 40.

Thus, the ball rolls or slides normally on the three spheroids 56 to rotate about its centre C.

As can be seen in particular in FIG. 9, each tubular duct 54 opens into the top wall 46 of the housing 44 at the centre of an associated housing 58 that is shallow and has a substantially square contour.

Each square housing 58 is designed to receive a trigger member 60, that is of matching shape and that will be described in greater detail hereinafter, that belongs to a validation switch.

In its top face 32, the casing 22 again comprises two housings 62T and 62L that are vertically open upwards and that each receive a tactile sensation generator 66T, 66L.

The casing 22 again comprises a horizontal side slot 68 that opens at both its ends in the longitudinal direction through the faces 36T and 38T.

The top portion of the casing 22 is closed by the cover 24 which is a piece moulded in insulating plastic in the general shape of a plate with a rectangular contour whose bottom horizontal face 68 presses vertically on the top face 32 of the casing 22 onto which the cover 24 is attached for example by screws 70.

The cover 24 is pierced with a vertical circular hole 72 for the top emergent portion of the ball 30 to pass through.

The cover thus performs a function as a top retainer of the ball in elastic contact on the three spheroids 56.

The bottom face 68' also comprises two housings matching the housings 62T and 62L.

In its bottom portion, the casing 22 again comprises an oblong horizontal slot 68 (FIG. 9) which opens longitudinally in the vertical side faces 36T and 38T.

The bottom portion of the casing 22, and particularly the housing 44, is closed off vertically in the downward direction by the bottom cap 26 that is a thick piece of metal sheet and that comprises for this purpose a bottom horizontal plate 78 of a shape matching that of the bottom face 34 of the casing 22 and to which the plate 78 is attached by four vertical screws 80.

Besides its function of closing the bottom portion of the casing 22 via the plate 78, the metal cap 26 also serves as a heat conductor between the hot points, such as for example the yokes of the electromagnetic tactile sensation generators, any components with heavy heat dissipation and the cold point or points such as the frame to which the cap 26 made of metal (or of any other material that is a good conductor of heat such as the ceramic-based materials) is attached, and as a heat sink via its external surface and, for this purpose, its heat exchange capacity with the outside is increased thanks to the two vertical side plates 82T and 82L that are made by bending, formed in a single piece with the bottom plate 78.

The plate 82L is adjacent to the side face 36L of the casing 22 to which it is attached by a horizontal screw 84L, while the vertical plate 82T is adjacent to the side face 36T to which it is attached by two horizontal screws 84T.

Figure 25:
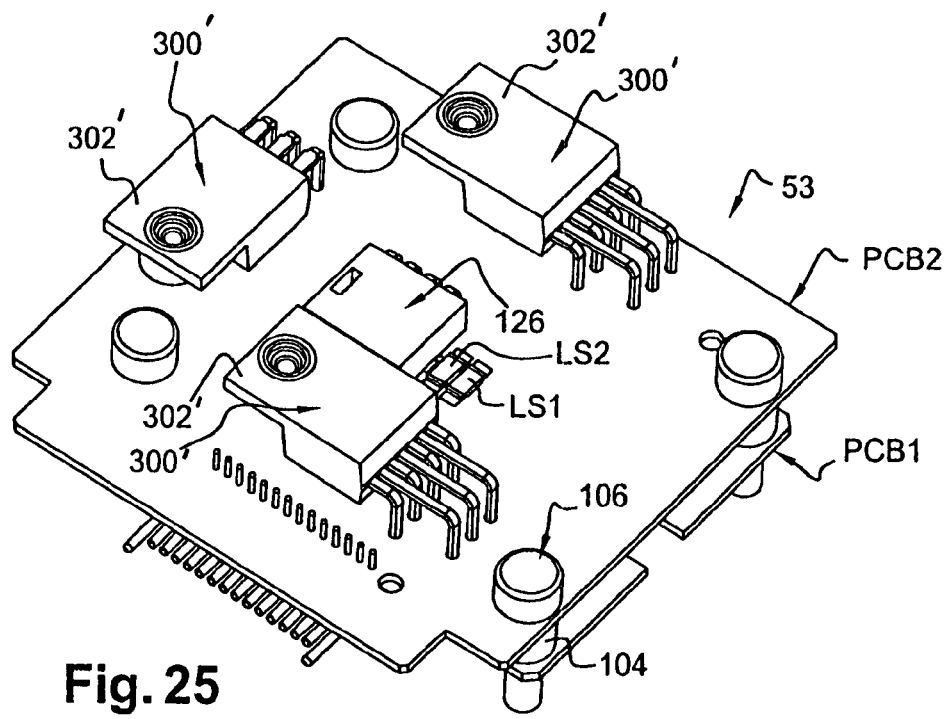
FIG. 25 is a bottom isometric view of a variant of the optoelectronic module of FIG. 4 that comprises components for the supply and control of the tactile sensation generators.
Figure 26:
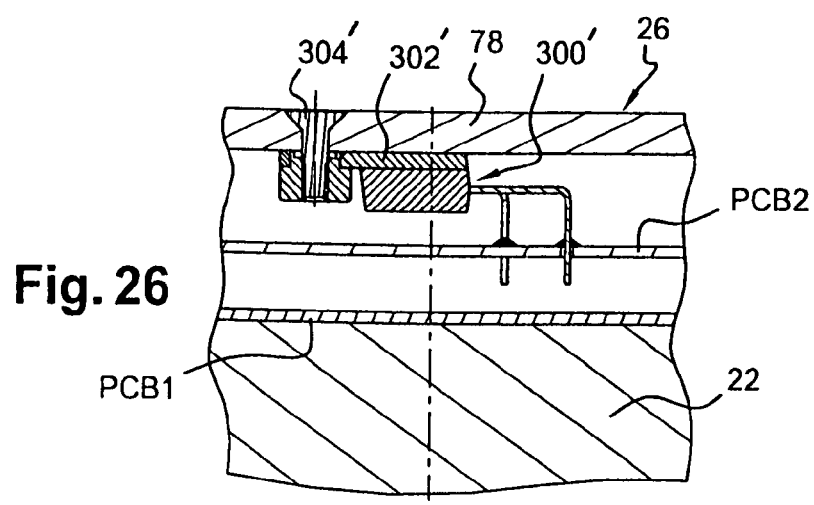
FIG. 26 is a detail view in section through the vertical plane passing through a component of FIG. 25.

To improve the cooling of the components supported by the printed circuit boards described hereinafter, and particularly by the bottom board PCB2, and particularly for the components with heavy heat dissipation 300', such as those used for the supply and control of the tactile sensation generators, certain portions 302' of these components may be directly connected to the boards facing the cap 26, for example by screws 304', as can be seen in FIGS. 25 and 26.

The plate 82T comprises a horizontal slot 86 opening opposite the horizontal slot 68 of the casing 22.

As can also be seen for example in FIG. 1, the bottom plate 26 extends longitudinally either side of the casing 22 to form two side wings 90 comprising holes 92 for fastening the device 20 in an electronic apparatus (not shown).

Now the bottom module 53 housed in the bottom housing 44 will be described in greater detail.

The module 53 is an "optoelectronic" module, in particular for detecting the rotary movements of the ball 30 about its centre.

The optical and image processing principles by reflection of the light on the convex peripheral surface 31 of the ball that are used in the device 20 are of a generally known design and do not form part of the present invention.

All that will be mentioned is that these principles consist in illuminating the surface 31 of the ball 30 whose surface state is perfectly smooth and has, as for example in document DE-A3.407.131, a regular pattern distributed evenly over the whole surface of the ball 30.

Thus an optical navigation technology is used that consists in measuring the positional changes by optical acquisition of sequential surface images, and in mathematically determining the direction and amplitude of the movement. There are no moving parts and it is not necessary to have great precision on the optical alignment.

The system for detecting rotation of the ball consists essentially of an optoelectronic assembly comprising a system of acquiring images, via a lens and at least one first "LED" diode that emits light towards the surface 31 of the ball 30, and also a digital signal processor that generates the values of relative movement Ax and Ay that are then converted into signals on two channels.

Accordingly, the module 53 consists essentially of a top horizontal printed circuit board PCB1 and a bottom horizontal printed circuit board PCB2.

The top board PCB1 comprises, on its top face, three series of pairs of fixed contact pads arranged in the same disposition in an equilateral triangle as the housings 58 and the spheroids 56 received in the duct 54.

Each pair of pads comprises a central pad 94 and a peripheral pad 96 that surrounds the pad 94.

In a known manner, each trigger member 60 is a dome which here comprises, as a non-limiting example, four radial branches in a star pattern each comprising an end that rests in electrical contact on the peripheral pad 96.

It may also be of a simpler shape, round, rectangular, triangular, etc.

In the normal rest state of the member 60, its central portion 100 is situated vertically above and in line with the central pad 94.

The central portion 100 is shaped with a cup in the form of a spherical cap 102 whose convexity is oriented upwards and which receives an associated spheroid 56 for rolling and/or sliding depending on the values of the coefficients of friction of the spheroids with, on the one hand, the surface of the ball and, on the other hand, the surface of the domes and tubular ducts.

Figure 11:
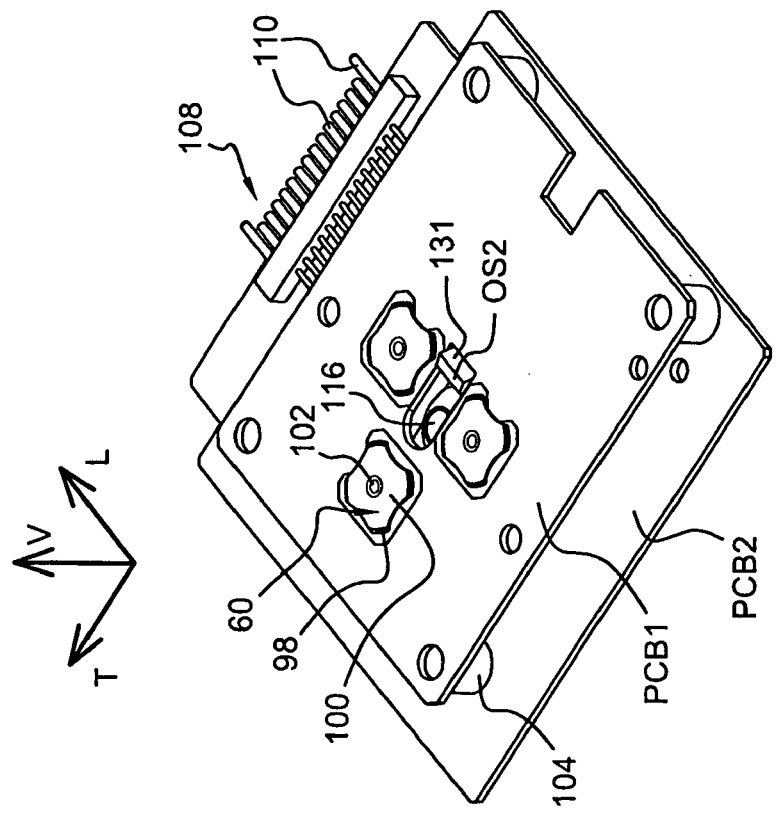
FIG. 11 is an isometric top view and from threequarter front left of the bottom module in which the three members for triggering the three validation switches are also represented.

When a vertical force is exerted, oriented downwards on the ball 56, the central portion 100 with its spherical cap 102 leaves its high stable position, illustrated for example in FIG. 11, to come to establish an electrical contact with the central pad 94 and thus establish an electrical connection between the two fixed pads 94 and 96.

As soon as the trigger force applied on the central portion 100 is relaxed, the trigger member of the dome 60 returns to its stable state in which the spherical cap is in the high position and in which the electrical connection between the pads 94 and 96 is interrupted. The three central pads 94 are, for example, connected to a common conductor track in the board PCB1, while each peripheral pad 96 is connected to a distinct associated track.

The connection of the tracks linked to the pads 94 and 96 with tracks of the bottom board PCB2 is made, in a known manner, by means of four tubular vertical spacers 104 preferably made of electrically conducting metal that are interposed between the boards PCB1 and PCB2.

The two boards PCB1 and PCB2, with the spacers 104, form a stack or sandwich that is assembled and attached beneath the top face 46 of the housing 44 by means of four vertical screws 106 which traverse the spacers 104 and which are screwed into the material of the casing 22.

Thus, in the assembled position, the top face of the top board PCB1 is pressed against the top face 46 of the housing 44 and positioned so that each pair of pads 94, 96 is situated opposite a housing 58 with a trigger member 60 "trapped" in the housing 58 so as to form three switches 60-94-96 distributed in an equilateral triangle about the vertical axis AV and each of which is controlled by an associated spheroid 56.

The attachment of the board PCB1 is completed by two screws 107.

For electrically connecting the various components of the module 53 with the outside of the casing 22 and therefore of the device 20, the module 53 comprises a connector 108, of a generally known design, that is attached to the top face of the bottom board PCB2 and whose output pins 110 extend horizontally through the horizontal slot 68 so that an additional connector (not shown) can be connected to the connector 108 through the aligned slots 68 and 86 thus connecting the electrical switching components and optoelectronic detection components of the module 53 with the circuits of the electronic apparatus (not shown) fitted with the device 20.

In the figures, the actuation ball 30 is represented in its normal operating position in which it is rotated by the user.

During this rotation about its centre C, the ball 30 rolls, via its convex peripheral surface 31, on the rolling or sliding spheroids 56 that rotate about themselves each in its tubular duct 54 and in the associated spherical cap 102 of a trigger member 60.

The three spheroids 56 are coplanar in a horizontal plane and the dimensions and arrangements of the various components are such that there is a radial clearance between the surface 31 of the ball 30 and the surface 42 of the cavity 40.

The actuation ball 30 thus rotates easily with the reduced friction and all its rotary movements about its centre C are detected by the bottom module 53 whose optical axis is the vertical axis AV passing through the centre C of the ball that is thus parallel with the vertical sliding axes of the spheroids 56 in their respective tubular ducts 54.

When the user desires to use the ball 30 as a member to actuate a validation switch or switches 60-94-96, he must vertically depress the ball by pressing generally vertically thereon.

Such a pushing or depression force on the ball 30 is transmitted to the three spheroids 56 on which the ball 30 rests.

Under the depression force, the spheroids 56 slide, vertically downwards, each in its associated tubular guide duct 54, to cause the elastic deformation of the associated trigger member 60.

This is how an electric switching function is performed by acting on the ball 30 by depressing the latter and by means of the rolling spheroids 56.

The global movement of the ball 30 during the "switching" travel is vertical along the vertical axis AV that is aligned with the optical axis of the bottom module 53.

Thus, during the switching or triggering travel of the ball 30 vertically downwards along the axis AV, the module 53 with its lens 116 detects no rotary movement of the ball 30 likely to produce a spurious signal representing its rotation since, relative to the lens 116, the ball does not rotate.

So that no apparent rotary movement of the ball is detected during the vertical validation travel, the detection system must be substantially in the vertical diametral axis of the device and of the ball, that is to say in the axis of vertical movement of the ball.

The optoelectronic module 53 will now be described in greater detail, with particular reference to FIGS. 10 to 24.

The module 53 comprises two distinct light sources LS1 and LS2 emitting respectively one in the invisible domain and the other in the visible domain, in order to form a module for detecting the rotation of the ball, and for illuminating the ball 30.

In the meaning of the invention, the term "to light" is used for the invisible light emitted towards the ball in order to allow the detection of its rotation, and the term "to illuminate" is used for the visible light emitted towards the ball in order, for example, to make the ball visible in the dark and/or give it a particular visible colour perceptible by the user.

The first light source LS1 for detecting the rotation of the ball 30 is here a first LED diode that is attached in a cutout 113 in the bottom board PCB2.

The invisible light emitted by the light source consisting of the diode LS1 is concentrated and guided by an optical unit 114 forming a guide of the light of complex form which extends horizontally between the two boards PCB1 and PCB2 and which particularly comprises a central detection lens 116 that is oriented vertically upwards whose vertical optical axis is common with the axis AV so as to be substantially perpendicular to the surface of the lit zone of the surface of the ball. The detection lens 116 that makes it possible to focus the light originating from the lit zone of the ball 30, and hence the image of that zone, is advantageously made in a single piece by moulding with the body of the unit 114 forming the light guide or optical guide and thus comprising the lens 116.

The lens 116 is aligned with the slot 52 of the casing to focus the image of the lit zone of the ball seen by the sensor through this slot and the top board PCB1 comprises a central oblong cutout 118 of transverse orientation aligned with the slot 52 of the casing.

The top horizontal face 120 of the unit 114 forming the light guide is pressed beneath the bottom face 115 of the top board PCB1 and it comprises, vertically beneath the lens 116 and level with the vertical optical axis of the latter, a blind cylindrical housing 122 which receives the sensitive element 124 belonging to a sensor or detector 126 of the image of the lit zone of the surface of the ball.

The detector 126 is attached beneath the bottom face of the bottom board PCB2 which comprises a rectangular central cutout 128 for the arrangement of the components and particularly the assembly of the guide 114 with the sensor 126.

The detector 126 is for example available commercially from "AGILENT TECHNOLOGIES", 395 Page Mill Road in Palo Alto, Calif.—USA, under reference ADNS-2620 (solid-state sensor) with eight terminals or pins of the hole-mount type.

In a known manner, the module 53 therefore has as its prime function the lighting of the ball 30 through the slot 52 and the capturing of the invisible light originating from the lit zone of the ball 30, through the lens 116 and by means of the sensor 126. The two distinct light sources consist here of two light-emitting diodes LED that are transversely adjacent one to the other and that are supported by the bottom printed circuit board PCB2 while being housed in the cutout or opening 113 that opens transversely into the central rectangular cutout 128.

This SMC version (SMT) of mounting diodes provides greater accuracy of their positioning relative to the unit 114 and avoids making use of additional parts while offering a reduced space requirement.

The two LED diodes LS1 and LS2 are arranged each to emit their light generally vertically upwards, as can be seen in particular in FIG. 13, towards a facing portion 135 of the bottom face 121 of the optical unit 114 which will now be described in greater detail, it being its first embodiment illustrated in particular in FIGS. 10 to 15.

The optical unit 114 is a part made of a material that is transparent to the lights used in the module 53, that is for example made in one piece by moulding and/or by machining.

Figures 15, 16:
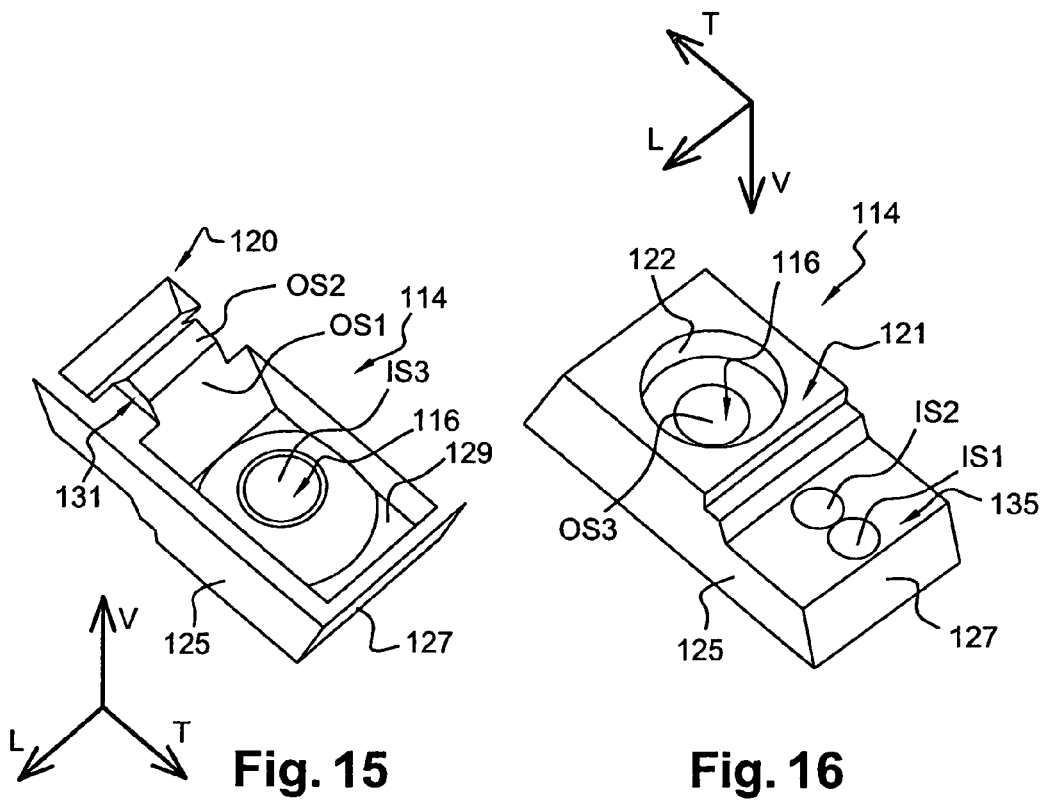
FIGS. 15 and 16 are top and bottom isometric views of the optical unit of FIG. 14.
Figure 17:
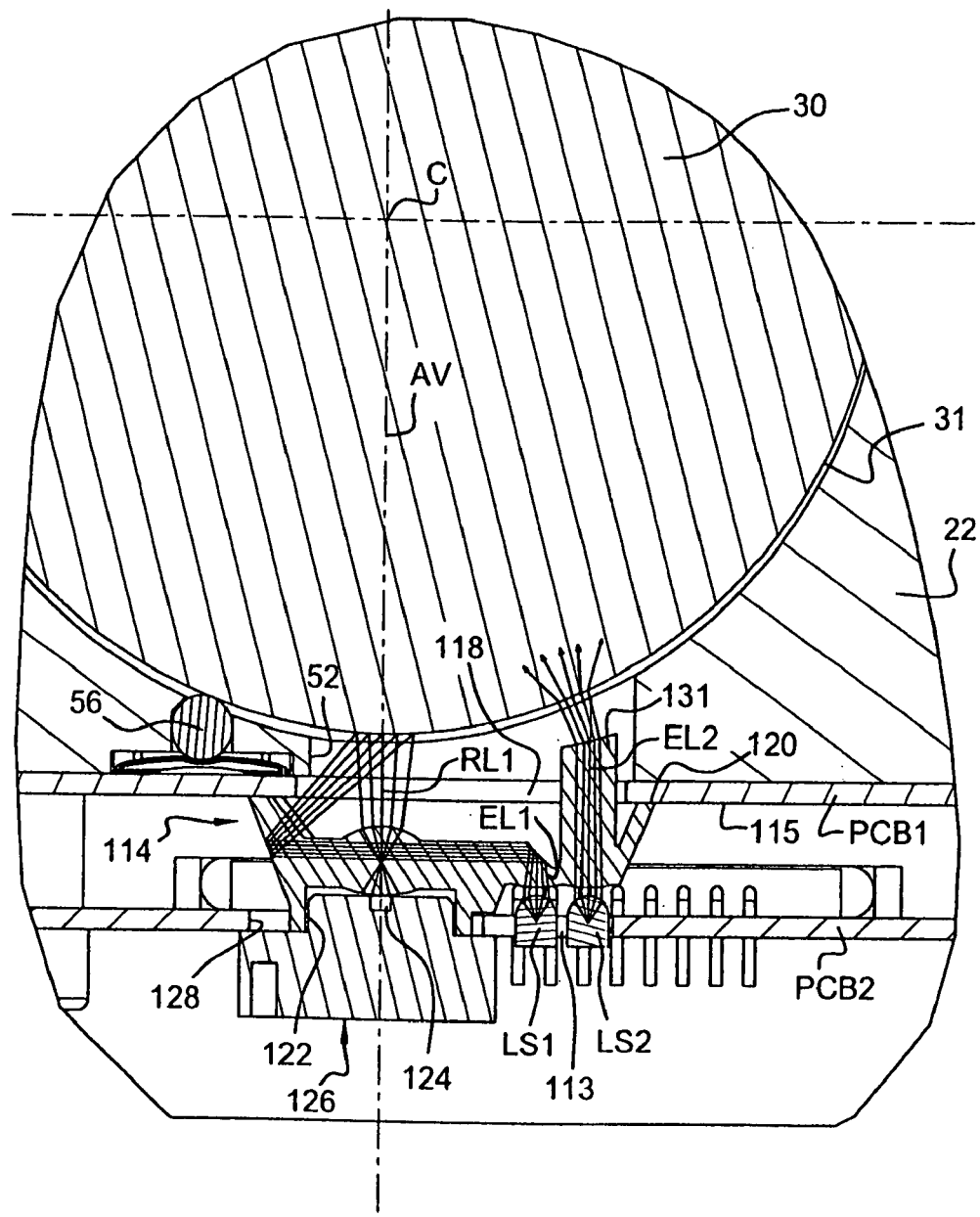
FIGS. 17 to 20 are views similar to those of FIGS. 13 to 16 that illustrate a second embodiment of the optical module and particularly its optical unit.

Considering FIGS. 15 and 16, it can be seen that the optical unit 114 has a general shape of a rectangular parallelepiped delimited by its top face 120 and bottom face 121 and by two opposite vertical transverse side faces 125 and by two opposite vertical longitudinal side faces 127.

Figure 14:
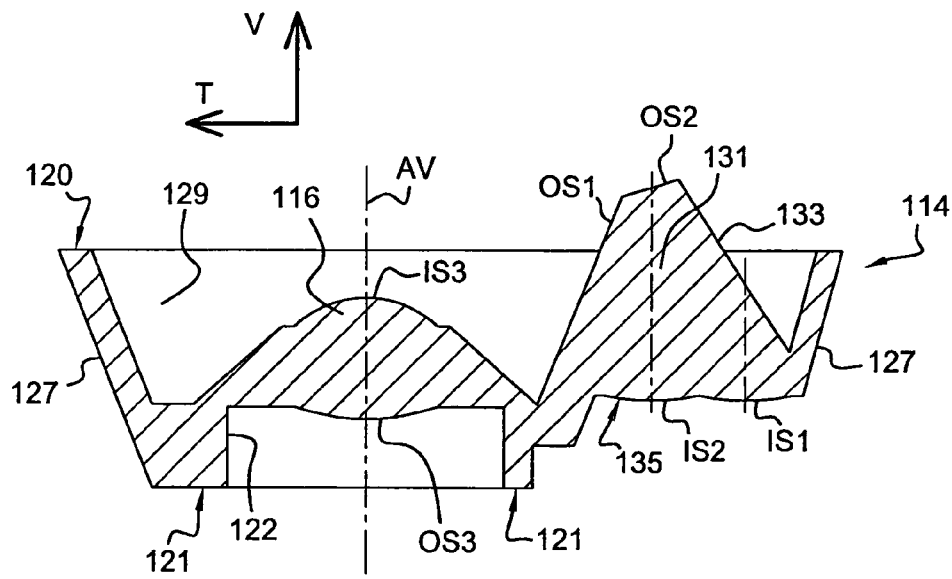
FIG. 14 is a detail view, on a larger scale, of the optical unit of FIG. 13 which is illustrated in section through its vertical and transverse mid-plane.

The top face 120 is generally recessed and delimits a cavity 129 that opens vertically upwards in the left portion of which, considering FIG. 14, is situated the lens 116 for focusing the light RL1 originating from the lit zone of the surface 31 of the ball 30, substantially along the vertical axis AV. The bottom face 121 comprises, centred on the axis AV, the housing 122 of circular cylindrical cross section designed to receive the sensor 126.

Offset transversely to the right, considering FIG. 14, the cavity 129 houses a polyhedral prism 131 which protrudes vertically above the plane of the top face 120.

As can be seen in particular in FIG. 15, the prism 131 extends longitudinally in a symmetrical manner towards the side faces 125 and it has a constant cross section in a generally trapezoidal shape.

Its trapezoidal cross section is delimited laterally by a first inclined side surface oriented to the left, when considering FIG. 14, which is the first exit surface OS1 for the invisible light ELI emitted by the first light source LS1.

The trapezoidal profile is delimited, on its top portion, by a substantially horizontal surface which forms the second light exit surface OS2 for the visible light EL2 emitted by the second light source LS2.

Figure 13:
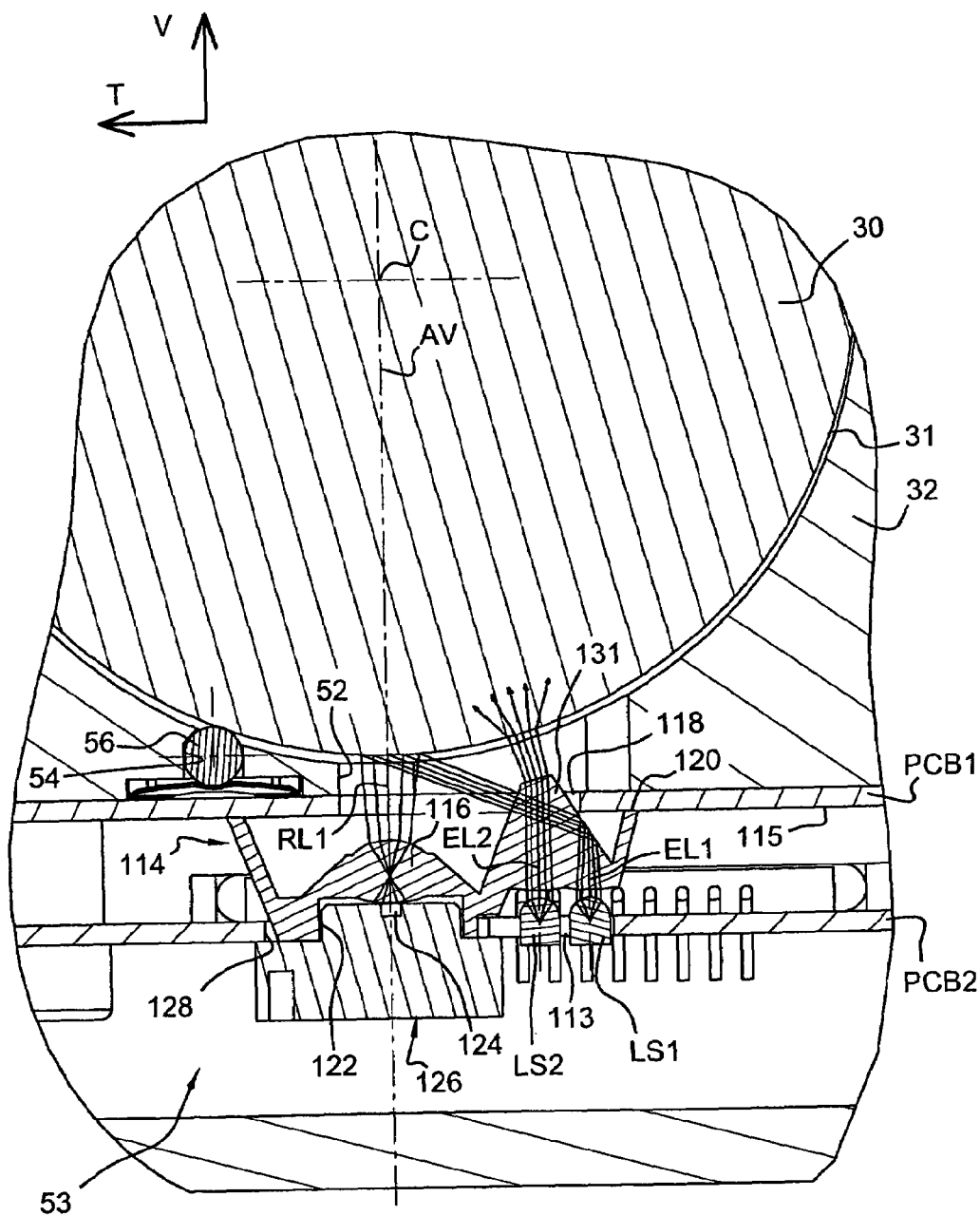
FIG. 13 is a detail view, on a larger scale, of the bottom portion of FIG. 8 indicating in particular the main paths of the light beams emitted by the two light sources and originating from the lit zone of the ball.

The second exit surface OS2 is slightly inclined relative to the horizontal so as to be substantially parallel to the tangent to the portion of the surface 31 of the ball 30 opposite, see FIG. 13, so that the rays of the light beam exiting through the second exit surface OS2 are oriented substantially radially relative to the centre C of the ball 30.

Finally, the trapezoidal profile is delimited laterally by a fully reflective side surface 133 on which are reflected the light rays of the light beam LS1 emitted by the first light source LS1 in order to orient them across the first exit surface OS1, as can be seen in FIG. 13.

The bottom face 121 of the optical unit 114 comprises, offset transversely to the right, a flat and horizontal portion 135 that is offset vertically upwards and that comprises a first light entry surface IS1 through which the light LS1 emitted by the first light source LS1 penetrates the prism 131 vertically upwards along an axis substantially parallel to the vertical axis AV.

In the same manner, the portion 135 comprises a second light entry surface IS2 through which the light ES2 emitted by the second light source LS2 penetrates the prism 131, vertically upwards along an axis substantially parallel to the vertical axis AV towards the second light exit surface OS2.

Thus, as can be seen in FIG. 13, the light beam ELI emitted by the first light source, after being fully reflected against the surface 133, crosses the light beam EL2 emitted by the second light source LS2.

The light RL1 originating from the zone of the ball 30 lit by the incident beam, is situated substantially to the right of the central vertical axis of the lens 116. This light RL1 penetrates the latter through the third light entry surface IS3 to re-emerge, after focusing by the lens 116, through the third light exit surface OS3 towards the sensitive element 124 of the sensor 126.

As can be seen in particular in FIG. 13, the relative positioning of the various components and elements and particularly of the two light sources LS1 and LS2 and of the optical unit 114 is perfectly ensured, in a very small space requirement, thanks to the design of the optical unit 114 and its arrangement with the other components of the module 53.

The first light source LS1 emits an "invisible" or "non-visible" light that is for example a light in the infrared domain whose wavelength is about 880 nm (e.g. 700 to 1300 nm).

This non-visible light is used only to detect the rotation of the ball 30 and it therefore causes no spurious effect of visible illumination of the ball.

However, the second light source LS2 emits light in the visible light spectrum and its wavelength is chosen optionally according to the applications.

Its wavelength is, for example, equal to 630 nm for a red light and may go up to 470 nm for a blue light for illumination of the ball.

The illumination of the ball is visible from the outside of the device, that is to say that the top protruding portion of the ball is illuminated by reflection and/or diffusion of the light EL2 emitted by the second light source EL2 which emits in the visible domain.

The material forming at least the peripheral layer of the ball is chosen so that the emitted light of the beam EL2 diffuses inside this layer and produces a homogeneous illumination effect over the whole peripheral surface of the ball.

This quality of diffusion of the light may particularly result from the technique of manufacturing the ball. Thanks to the ball manufacturing techniques, it is, for example, possible to disperse in the peripheral layer of the material forming the ball, for example in the form of a powder, homogeneous pigmented grains that are distributed uniformly in a homogeneous and even manner and that produce the pattern on the surface of the ball, the material in which the grains are distributed being for example translucent, this pattern being "seen" by the image sensor.

The optical unit 114 is therefore a complex guide of visible and invisible lights that incorporates various lenses and optical surfaces made in one piece by moulding.

In a second embodiment illustrated in FIGS. 17 to 20, the prism 131 is used optically only for the transmission of the light EL2 emitted by the second light source LS2 that penetrates it through the second bottom light entry surface IS2 and that exits it through the second top light exit surface OS2.

The first entry surface IS1 of light emitted by the first light source LS1 is situated transversely between the second light entry surface IS2 and the third light exit surface OS3.

Figure 18:
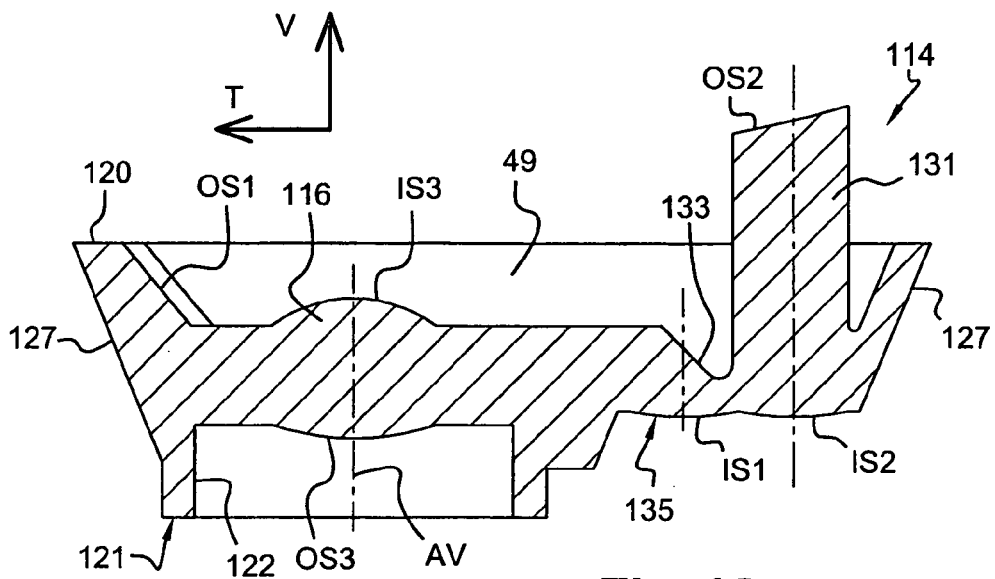
Figure 19:
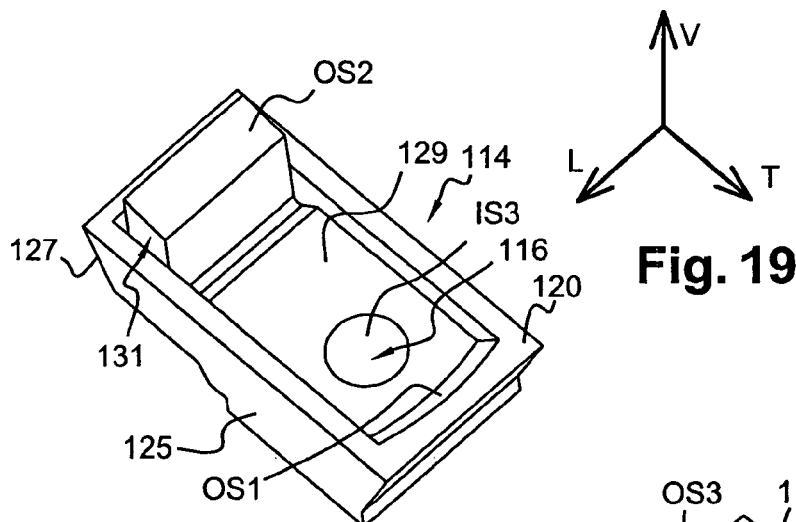
Figure 20:
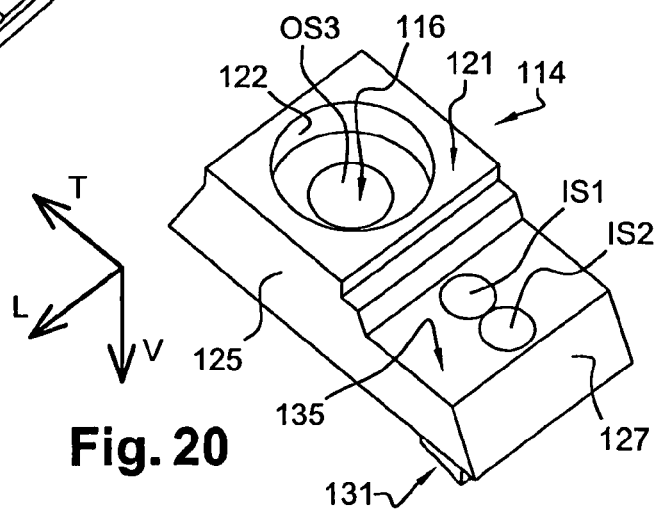

The light that penetrates vertically upwards through the first surface IS1 is fully reflected on the inclined full reflection surface 133 which no longer belongs to the prism 131 but which is oriented so that the emitted light ELI is fully and horizontally reflected therein to the left to reach a second full reflection inclined surface consisting of the opposite portion of the left longitudinal side face 127 of the optical unit 114 looking at FIG. 18.

After this second full reflection, the light ELI emitted by the first source LS1 is fully redirected vertically upwards and it exits the optical unit 114 through the first light exit surface OS1 which is here an inclined surface arranged on the left in the side wall of the cavity 49.

On exiting via the first exit surface OS1, the incident light ELI is directed towards the surface 31 in order to light a polar zone in the general shape of a disc.

The image of this lit zone and the light originating from this zone to form the image thereof, are propagated vertically downwards towards the third entry surface IS3 of the lens 116, and substantially along the vertical axis AV.

The third light entry surface IS3 is therefore situated transversely between the first light exit surface OS1 and the second light exit surface OS2.

As previously, the illumination beam is projected, via the second exit surface OS2, substantially perpendicular to the opposite portion of the surface 31 of the ball 30 to prevent or minimize the risks of spurious reflections.

The geometric arrangement is also designed so that the zone reached by the illumination beam EL2 is distinct from the zone reached by the light of the detection beam ELI.

Thus, the "spurious light" risk of the illumination light beam EL2 on the image acquisition system 124,126 is eliminated.

Furthermore, the design described makes it possible to choose wavelengths for the two light sources whose offset is very high in order to further reduce this spurious light risk.

In the second embodiment that has just been described, note that there is no crossing between the two light beams ELI and EL2 inside the optical unit 114.

Figure 21:
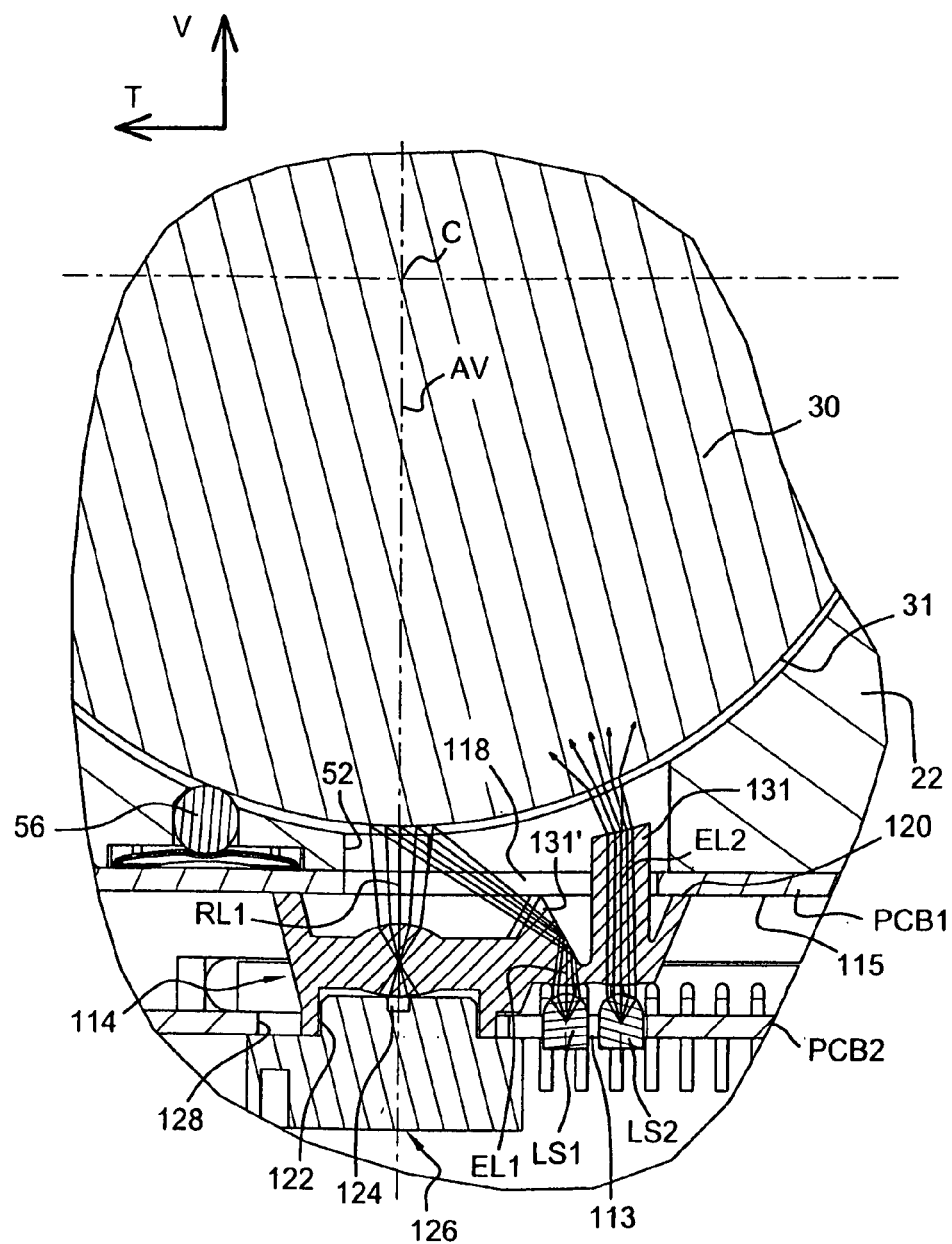
FIGS. 21 to 24 are views similar to those of FIGS. 13 to 16 that illustrate a second embodiment of the optical module and particularly of the optical unit according to the invention.
Figure 22:
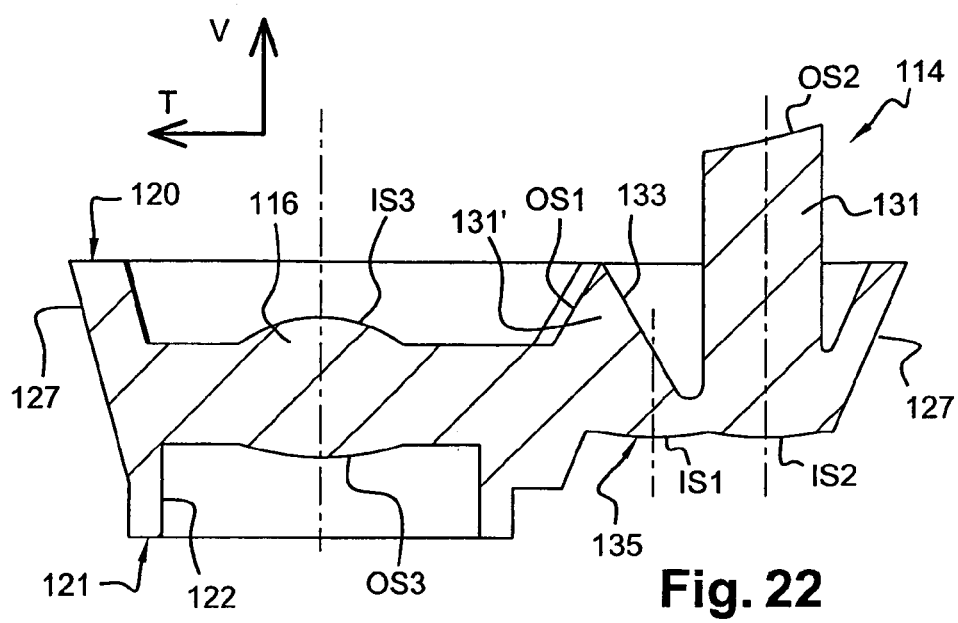
Figure 23:
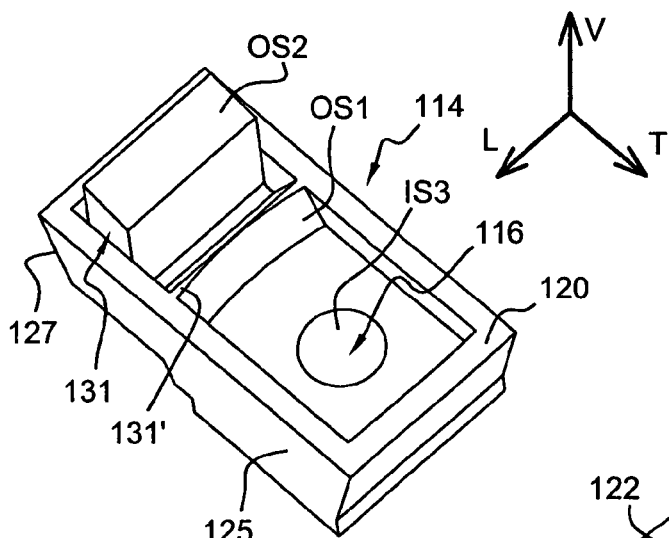
Figure 24:
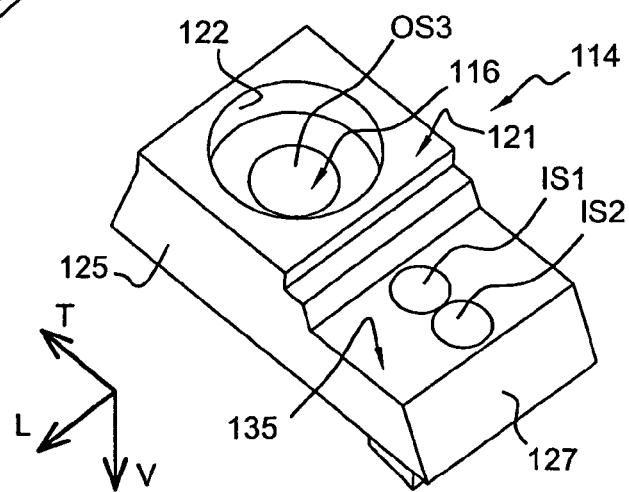

The third embodiment will now be described with reference to FIGS. 21 to 23.

By comparison with the second embodiment, note that the arrangement of the optical unit 114 is generally identical except that, inside the optical unit 114, the light of the first light beam ELI undergoes only one full reflection on an inclined surface 133 to subsequently exit via a first adjacent exit surface OS1, the two surfaces 133 and OS1 delimiting a prism 131' of triangular cross section situated transversely between the lens 116 and the prism 131.

Thus, in the top face of the optical unit 114, the first exit surface OS1 is situated transversely between the third light entry surface IS3 and the second light exit surface OS2.

The optical unit or light guide 114 is thus greatly simplified and there is no optical crossing of the two light beams inside the optical unit 114.

The tactile sensation generators 66L, 66T are independent of the means of detecting the rotation of the ball, that is to say that they comprise no component that is common with the detection means.

The tactile sensation generators 66L and 66T each consist essentially of a front roller 140L, 140T which interacts permanently by friction with the surface 31 of the ball 30 and which is connected in rotation to a generator shaft 142L, 142T, whose rear axial end is connected in rotation to a rotor 144L, 144T which belongs to electromagnetic means that are capable of attracting and/or holding the shaft 142L, 142T in a determined angular position and that also comprise a stator body 146L, 146T comprising a tubular yoke which houses a tubular winding—whose supply wires are connected to the bottom printed circuit board which supports electronic components for the control of the tactile sensation generators—which itself surrounds a central core 147L, 147T.

The external parts 146L, 146T are nested in the housings 62L, 62T and are held by horizontal screws 152L, 152T which traverse matching holes in the vertical plates 82L, 82T of the bottom metal cap 26.

Each roller 140T is permanently pressed against the surface 31 of the ball 30 by an elastic clip 141L, 141T.

It is thus possible to apply to the ball 30 a tactile effect or sensation and this can be done irrespective of the position and orientation of the movements of the ball, and also irrespective of the operation of the means for detecting the rotation of the ball 30.

Sealing means are also provided in the device 20, particularly to prevent foreign bodies, and particularly dust, from entering the device and more particularly the cavity 40.

The sealing means also have the function of cleaning the surface 31 of the operating ball 30 during the rotary movements of the latter about its axis. In the embodiment illustrated in the figures, the sealing means consist of a top elastic washer 300, for example made of metal, and an intermediate washer 302, for example made of "Teflon®"—polytetrafluoroethylene—and a bottom contact washer 304 for example made of metal.

The intermediate flexible washer 302 performs the function of a wiper seal over the whole peripheral spherical surface of the ball, at the base of its portion protruding from the cover 24, and the top elastic washer 300 exerts an elastic downward force over the whole periphery of the intermediate washer 302.

In addition, when the ball is depressed vertically for the purpose of a validation or selection action, the sealing means provide a controlled braking effect which prevents spurious rotary movements of the ball about its centre.

What is claimed is:

1. A control device (20) particularly for controlling the movements of a cursor on a screen of an electronic apparatus, comprising:
  an actuation member (30) in the form of a spherical ball with a detection surface (31) capable of being manipulated by a user;
  a ball casing (22) which forms a concave face (42) that surrounds at least a portion of the ball (30);
  elements (56) for guiding the ball (30) in rotation, so that the ball rotates about its centre (C);
  at least a first detection light source (LS1) to emit at least one incident detection light beam (EL1) towards the ball (30);
  and means forming image sensors (126) that receive the light (RL1) originating from the zone of the ball (30) lit by the incident detection beam (EL1);
characterized in that:
  the first light source (LS1) emits an invisible light (EL1);
  and the device comprises at least a second light source (LS2), distinct from the first light source (LS1), for illuminating the ball (30) which emits a visible illumination light (EL2) towards the ball (30).

2. A device according to claim 1, characterized in that the first light source (LS1) emits a detection light (EL1) in the infrared domain.

3. A device according to claim 2, characterized in that the wavelength of the infrared detection light (EL1) emitted by the first detection light source (LS1) is approximately 880 nm.

4. A device according to claim 3, characterized in that the wavelength of the visible illumination light (EL2) emitted by the second illumination light source (LS2) lies between approximately 470 nm and approximately 630 nm.

5. A device according to claim 1, characterized in that the light source (LS1, LS2) is a light-emitting diode.

6. A device according to claim 1, characterized in that the first light source (LS1) and second light source (LS2) belong to an optoelectronic module (53) fitted to the casing (22).

7. A device according to claim 6, characterized in that the module (53) comprises an optical light guidance unit (114) comprising:
  a first light entry surface (IS1) for the invisible light (EL1) that is emitted by the first light source (LS1);
  a second light entry surface (IS2) for the visible light (EL2) that is emitted by the second light source (LS2);
  a third light entry surface (IS3) for the light (RLI) originating from the zone of the ball (30) lit by the incident detection beam (EL1);
  a first exit surface (OS1) for the invisible light (EL1) that is emitted by the first light source (LS1) and that entered the optical unit (114) via the first entry surface (IS1);
  a second exit surface (OS2) for the invisible light (EL2) that is emitted by the second light source (LS2) and that entered the optical unit (114) via the second entry surface (IS2);
  a third exit surface (OS3) for the light (RL1) originating from the zone of the ball (30) lit by the incident detection beam (EL1) and that entered the optical unit (114) via the third entry surface (IS3).

8. A device according to claim 7, characterized in that the said third entry surface (IS3) belongs to a portion of the unit (114) that is shaped like an objective lens.

9. A device according to claim 7, characterized in that the first light entry surface (IS1) and second light entry surface (IS2) and the third light exit surface (OS3) are oriented generally downwards and are arranged in a bottom face of the optical unit (114).

10. A device according to claim 7, characterized in that the first light exit surface (OS1) and second light exit surface (OS2) and the third light entry surface (IS3) are oriented generally upwards and are arranged in a top face of the optical unit (114).

11. A device according to claim 7, characterized in that the light entry and light exit surfaces are generally aligned along a vertical and transverse plane of the optical unit (114).

12. A device according to claim 11, characterized in that the third light exit surface (OS3) is substantially vertically aligned with the third light entry surface (IS3).

13. A device according to claim 11, characterized in that:
  the second light entry surface (IS2) is situated transversely between the first light entry surface (IS1) and the third light exit surface (OS3);
  and the first light exit surface (OS1) is situated transversely between the second light exit surface (OS2) and the third light entry surface (IS3).

14. A device according to claim 11, characterized in that the first light entry surface (IS1) is situated transversely between the second light entry surface (IS2) and the third light exit surface (OS3).

15. A device according to claim 14, characterized in that the third light entry surface (IS3) is situated transversely between the second light exit surface (OS2) and the first light exit surface (OS1).

16. A device according to claim 14, characterized in that the first light exit surface (OS1) is situated transversely between the second light exit surface (OS2) and the third light entry surface (IS3).

17. A device according to claim 7, characterized in that the optical unit (114) comprises a housing capable of receiving the sensor (126) of the light of the detection light beam (RL1) reflected by the ball (30).

18. A device according to claim 17, characterized in that the said housing is a blind housing open in the bottom face of the optical unit (114).

19. A device according to claim 7, characterized in that the device includes an optical unit (114) that is made in a single piece of material transparent to the said lights (EL1, EL2, RI-1).

20. A device according to claim 1, characterized in that the casing (22) comprises a window (52) for the emitted lights (EL1, EL2) and the light (RL1) originating from the zone of the ball (30) lit by the incident detection beam (EL1) to pass through.

* * * * *